(12) United States Patent
Gupta et al.

(10) Patent No.: US 10,671,735 B2
(45) Date of Patent: Jun. 2, 2020

(54) FRAMEWORK FOR SECURITY STRENGTH AND PERFORMANCE ANALYSIS OF MACHINE LEARNING BASED BIOMETRIC SYSTEMS

(71) Applicants: Sandeep K. S. Gupta, Phoenix, AZ (US); Ayan Banerjee, Mesa, AZ (US); Seyed Koosha Sadeghi Oskooyee, Tempe, AZ (US); Mohammad Javad Sohankar Esfahani, Tempe, AZ (US)

(72) Inventors: Sandeep K. S. Gupta, Phoenix, AZ (US); Ayan Banerjee, Mesa, AZ (US); Seyed Koosha Sadeghi Oskooyee, Tempe, AZ (US); Mohammad Javad Sohankar Esfahani, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 228 days.

(21) Appl. No.: 15/949,469

(22) Filed: Apr. 10, 2018

(65) Prior Publication Data
US 2018/0300487 A1 Oct. 18, 2018

Related U.S. Application Data

(60) Provisional application No. 62/483,863, filed on Apr. 10, 2017.

(51) Int. Cl.
| | | |
|---|---|---|
| G06F 21/00 | (2013.01) |
| G06F 21/57 | (2013.01) |
| G06F 21/46 | (2013.01) |
| G06F 21/32 | (2013.01) |
| G06N 20/00 | (2019.01) |
| G06N 7/00 | (2006.01) |
| G06N 5/00 | (2006.01) |
| G06N 3/02 | (2006.01) |
| G06N 20/10 | (2019.01) |

(52) U.S. Cl.
CPC ........... *G06F 21/577* (2013.01); *G06F 21/32* (2013.01); *G06F 21/46* (2013.01); *G06N 3/02* (2013.01); *G06N 5/003* (2013.01); *G06N 7/005* (2013.01); *G06N 20/00* (2019.01); *G06N 20/10* (2019.01); *G06F 2221/034* (2013.01)

(58) Field of Classification Search
CPC ........ G06F 21/32; G06F 21/46; G06F 21/577; G06N 7/003; G06N 7/005; G06N 20/10; G06N 20/00
See application file for complete search history.

(56) References Cited

U.S. PATENT DOCUMENTS

| | | |
|---|---|---|
| 9,424,084 B2 | 8/2016 | Gupta et al. |
| 9,619,213 B2 | 4/2017 | Gupta et al. |

(Continued)

OTHER PUBLICATIONS

Youmaran, et al., "Measuring biometric sample quality in terms of biometric feature information in iris images," Journal of Electrical and Computer Engineering, vol. 2012, p. 22, 2012.

(Continued)

*Primary Examiner* — Beemnet W Dada
(74) *Attorney, Agent, or Firm* — Polsinelli PC

(57) ABSTRACT

A framework for measuring the security strength of biometric security systems against spoofing attacks considering the adversary's knowledge about the system is disclosed.

20 Claims, 9 Drawing Sheets

(56) References Cited

U.S. PATENT DOCUMENTS

| | | | |
|---|---|---|---|
| 9,626,521 B2 | 4/2017 | Gupta et al. | |
| 9,642,543 B2 | 5/2017 | Banerjee et al. | |
| 9,706,963 B2 | 7/2017 | Gupta et al. | |
| 10,074,028 B2 | 9/2018 | Gupta et al. | |
| 10,342,447 B2 | 7/2019 | Banerjee et al. | |
| 2013/0317377 A1 | 11/2013 | Gupta et al. | |
| 2018/0103911 A1 | 4/2018 | Gupta et al. | |
| 2018/0189678 A1 | 7/2018 | Gupta et al. | |
| 2018/0301061 A1 | 10/2018 | Paudyal et al. | |
| 2019/0080802 A1* | 3/2019 | Ziobro | G16H 50/30 |
| 2019/0108453 A1* | 4/2019 | Schwabe | G06N 20/00 |
| 2019/0140833 A1* | 5/2019 | Grajek | H04L 9/3231 |
| 2019/0188587 A1 | 6/2019 | Gupta et al. | |
| 2019/0188604 A1* | 6/2019 | Amitava | G06N 20/00 |
| 2019/0304000 A1* | 10/2019 | Simpson | G06Q 30/0633 |
| 2019/0307386 A1* | 10/2019 | Castillo | A61B 5/02055 |

OTHER PUBLICATIONS

Zhang, et al., "Adversarial feature selection against evasion attacks," IEEE transactions on cybernetics, vol. 46, No. 3, pp. 766-777, 2016.

Zhang, et al., "Improved nystrom low-rank approximation and error analysis," in Proceedings of the 25th International Conference on Machine Learning, ser. ICML '08. New York, NY, USA: ACM, 2008, pp. 1232-1239. [Online]. Available: http://doi.acm.org/10.1145/1390156.1390311.

Adler, "Biometric system security," in Handbook of biometrics. Springer, 2008, pp. 381-402.

Adler al., "Towards a measure of biometric information," in Electrical and Computer Engineering, 2006. CCECE'06. Canadian Conference on. IEEE, 2006, pp. 210-213.

Adler, et al., "Towards a measure of biometric feature information," Pattern Analysis and Applications, vol. 12, No. 3, pp. 261-270, 2009.

Al-Fahoum, et al., "Methods of EEG signal features extraction using linear analysis in frequency and time-frequency domains," ISRN neuroscience, vol. 2014, 2014.

Atla, et al., "Sensitivity of different machine learning algorithms to noise," Journal of Computing Sciences in Colleges, vol. 26, No. 5, pp. 96-103, 2011.

Biggio, et al., "Security evaluation of pattern classifiers under attack," IEEE Transactions on Knowledge and Data Engineering, vol. 26, No. 4, pp. 984-996, 2014.

Brigham, et al., "Subject identification from electroen-cephalogram (EEG) signals during imagined speech," in Biometrics: Theory Applications and Systems (BTAS), 2010 Fourth IEEE International Conference on. IEEE, 2010, pp. 1-8.

Cakmak, et al., "Determining the state of truthfulness and falsehood by analyzing the acquired EEG signals," in IEEE 12th International CSPA, 2016, pp. 173-178.

Campisi, et al., "Brain waves for automatic biometric-based user recognition," Information Forensics and Security, IEEE Transactions, vol. 9, No. 5, pp. 782-800, 2014.

Chuang, et al., "I think, therefore I am: Usability and security of authentication using brainwaves," in Financial Cryptography and Data Security. Springer, 2013.

Clancy, et al., "Secure smartcard-based fingerprint authentication," in Proceedings of the 2003 ACM SIGMM workshop on Biometrics methods and applications, 2003, pp. 45-52.

Del Pozo-Banos, et al., "Electroencephalogram subject identification: A review," Expert Systems with Applications, 2014.

Doborjeh, et al., "A spiking neural network methodology and system for learning and comparative analysis of EEG data from healthy versus addiction treated versus addiction not treated subjects." IEEE transactions on bio-medical engineering, 2015.

E. Niedermeyer and F. L. da Silva, Electroencephalography: basic principles, clinical applications, and related fields. Lippincott Williams & Wilkins, 2005.

Farwell, et al., "Brain fingerprinting field studies comparing P300-MERMER and P300 brainwave responses in the detection of concealed information," Cognitive Neurodynamics, pp. 263-299, 2013.

Fisher III, et al., "A methodology for information theoretic feature extraction," in Neural Networks Proceedings, 1998. IEEE World Congress on Computational Intelligence. The 1998 IEEE International Joint Conference, vol. 3, 1998, pp. 1712-1716.

Goldberger, et al., "Physiobank, physiotoolkit, and physionet components of a new research resource for complex physiologic signals," Circulation, vol. 101, No. 23, pp. e215-e220, 2000.

Gomez-Barrero, et al., "Face verification put to test: A hill-climbing attack based on the uphill-simplex algorithm," in Biometrics (ICB), 2012 5th IAPR International Conference on. IEEE, 2012, pp. 40-45.

Hu, et al., "A pervasive EEG-based biometric system," in Proceedings of 2011 international workshop on Ubiquitous affective awareness and intelligent interaction. ACM, 2011, pp. 17-24.

Jain, et al., "Biometrics: a tool for information security," Information Forensics and Security, IEEE Transactions on, vol. 1, No. 2, pp. 125-143, 2006.

Kantchelian, et al., "Large-margin convex polytope machine," in Advances in Neural Information Processing Systems 27, Curran Associates, Inc., 2014, pp. 3248-3256.

Kloft, et al., "Security analysis of online centroid anomaly detection," Journal of Machine Learning Research, vol. 13, No. Dec, pp. 3681-3724, 2012.

Laskov, et al., "A framework for quantitative security analysis of machine learning," in Proceedings of the 2nd ACM workshop on Security and artificial intelligence. ACM, 2009, pp. 1-4.

Lee, et al., "A volume problem for an n-dimensional ellipsoid intersecting with a hyperplane," Linear Algebra and its Applications, vol. 132, pp. 93-102, 1990.

Lim, et al., "Entropy measurement for biometric verification systems," IEEE transactions on cybernetics, vol. 46, No. 5, pp. 1065-1077, 2016.

Marcel, et al., "Person authentication using brain-waves (EEG) and maximum a posteriori model adaptation," Pattern Analysis and Machine Intelligence, IEEE Transactions on, vol. 29, No. 4, pp. 743-752, 2007.

McDaniel, et al., "Machine learning in adversarial settings," IEEE Security & Privacy, vol. 14, No. 3, pp. 68-72, 2016.

Medina-Salgado, et al., "Characterization of EEG signals using wavelet transform for motor imagination tasks in bci systems," in Symposium of Signals, Images and Artificial Vision-2013: STSIVA-2013. IEEE, 2013, pp. 1-4.

Mohanchandra, "Criminal forensic: An application to EEG," in Recent and Emerging trends in Computer and Computational Sciences. IEEE, 2015, pp. 18-21.

Molchanov, "Canonical and boundary representations on a hyperboloid of one sheet," Acta Applicandae Mathematica, vol. 81, No. 1, pp. 191-214, 2004.

Monrose, et al., "Cryptographic key generation from voice," in Security and Privacy, 2001. S&P 2001. Proceedings. 2001 IEEE Symposium on. IEEE, 2001, pp. 202-213.

Nelson, et al., "Understanding the risk factors of learning in adversarial environments," in Proceedings of the 4th ACM workshop on Security and artificial intelligence. ACM, 2011, pp. 87-92.

Nicolas-Alonso, et al., "Brain computer interfaces, a review," Sensors, pp. 1211-1279, 2012.

Oskooyee, et al., "Implementing a cognition cycle with words computation," in Computational Intelligence, Cognitive Algorithms, Mind, and Brain (CCMB), 2011 IEEE Symposium on. IEEE, 2011.

Oskooyee, et al., "Neuro movie theatre: A real-time internet-of-people based mobile application," in ACM HotMobile, 2015.

Pham, et al., "Multi-factor EEG-based user authentication," in 2014 International Joint Conference on Neural Networks (IJCNN). IEEE, 2014, pp. 4029-4034.

Poh, et al., "Anti-forensic resistant likelihood ratio computation: A case study using fingerprint biometrics," in 22nd IEEE EUSIPCO, 2014.

(56) References Cited

OTHER PUBLICATIONS

Pore, et al., "Enabling real-time collaborative brain-mobile interactive applications on volunteer mobile devices," in HotWireless. ACM, 2015, pp. 46-50.

Sadeghi, et al., "Safedrive: An autonomous driver safety application in aware cities," in 2016 IEEE International Conference on Pervasive Computing and Communication Workshops (PerCom Workshops).

Samanta, "Prediction of chaotic time series using computational intelligence," Expert Systems with Applications, vol. 38, No. 9, pp. 11 406-11 411, 2011.

Sanchez, "Advanced support vector machines and kernel methods," Neurocomputing, vol. 55, No. 1-2, pp. 5-20, 2003.

Schalk, et al., "BCI2000: a general-purpose Brain-Computer Interface (BCI) system," Biomedical Engineering, IEEE Transactions on, vol. 51, No. 6, pp. 1034-1043, 2004.

Sohankar, et al., "E-bias: A pervasive EEG-based identification and authentication system," in Proceedings of the 11th ACM Symposium on QoS and Security for Wireless and Mobile Networks. ACM, 2015, pp. 165-172.

Srndic, et al., "Practical evasion of a learning-based classifier: A case study," in Security and Privacy (SP), 2014 IEEE Symposium on IEEE, 2014. pp. 197-211.

Takahashi, et al., "A measure of information gained through biometric systems," Image and Vision Computing, vol. 32, No. 12, pp. 1194-1203, 2014.

Thorpe, et al., "Pass-thoughts: authenticating with our minds," in Proceedings of workshop on New security paradigms. ACM, 2005, pp. 45-56.

Uludag, et al., "Biometric cryptosystems: issues and challenges," Proceedings of the IEEE, vol. 92, No. 6, pp. 948-960, 2004.

Wang, et al., "Design of electrode layout for motor imagery based brain—computer interface," Electronics Letters, vol. 43, No. 10, pp. 557-558, 2007.

Wilson, "Volume of n-dimensional ellipsoid," Sciencia Acta Xaveriana, vol. 1, No. 1, pp. 101-106, 2010.

U.S. Appl. No. 16/413,018, filed May 15, 2019.

\* cited by examiner (A) FFT (B) DWT (C) AR

- The schema of feature space division by a boundary-based classifier. Matching check tests whether the input data is similar to existing data in the system. In case of similarity, the input data will be rejected due to possible replay attack:

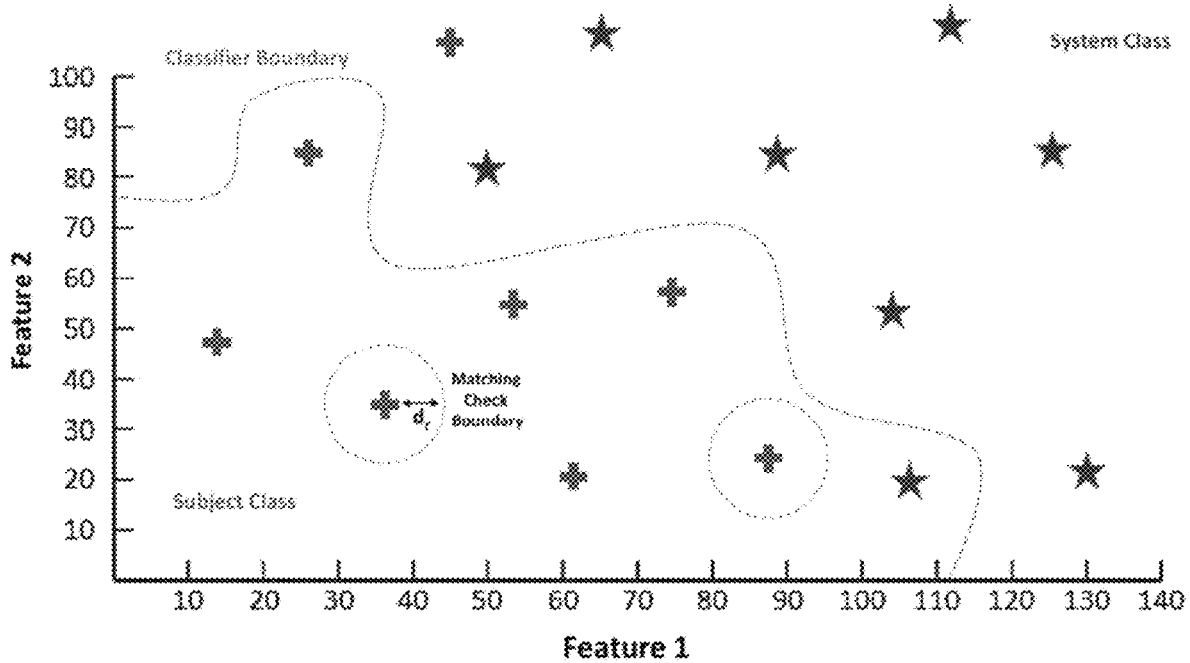

- Security strength calculation which is defined as logarithm of average total number of attempts to guess a data point in the subject class:

$$K = log_2(1/\mathcal{P}_{auth}) = log_2 \left( \frac{\prod_{i=1}^{m} q_i}{V_{sub} - \sum_{\forall d} \frac{\pi^{m/2} d_r^m}{\Gamma(\frac{m}{2}+1)}} \right)$$

where $K$ is the Number of Security bits, $\mathcal{P}_{auth}$ is the Probability of Guessing Data in Subject Class, $\prod_{i=1}^{m} q_i$ relates to Feature Space Dimension (e.g. 2) and Range of Feature Values, $V_{sub}$ is the Volume of the Subject Class, the Gamma Distribution term, and $d_r$ is the Matching Check Boundary Radius.

- As seen in the above equation, security strength of the system is proportional to the radius of matching check boundary. Greater radius means higher security strength, but it also leads to higher false rejection rate that reduces the system performance:

$$K \propto d_r \;\; \rightarrow \;\; Security\;Strength \propto \frac{1}{Performance}$$

- Our invented framework can regulate the amount of desired security strength or performance by adjusting the matching check radius.

FIG. 12

FRAMEWORK FOR SECURITY STRENGTH AND PERFORMANCE ANALYSIS OF MACHINE LEARNING BASED BIOMETRIC SYSTEMS

CROSS REFERENCE TO RELATED APPLICATIONS

This is a non-provisional application that claims benefit to U.S. provisional application Ser. No. 62/483,863 filed on Apr. 10, 2017, which is herein incorporated by reference in its entirety.

FIELD

The present disclosure generally relates to systems and methods for evaluating the strength of bio-metric systems, and in particular to a framework for measuring the security strength of bio-metric security systems against spoofing attacks considering the adversary's knowledge about the system.

BACKGROUND

Biometric Security Systems (BSS) are increasingly becoming popular due to the ease of signal collection through wearable& Biometrics such as electroencephalogram (EEG) contain information that are unique to a person, nearly impossible to impersonate without invading personal space, and chaotic over time, that makes them favorable for security applications. For example, several researchers have proposed EEG-based Security Systems (ESS) for authentication of credentials. The core assumption in many BSS including ESS is that the biometric signal is chaotic, and has high entropy, that cannot be guessed by an adversary, potentially blocking spoofing attack. As entropy increases the effort required by the adversary to guess the signal also increases. In this sense, entropy measures are common evaluation metrics of security strength.

It is with these observations in mind, among others, that various aspects of the present disclosure were conceived and developed.

BRIEF DESCRIPTION OF THE DRAWINGS

FIG. 12 is a graphical representation of a schema showing feature space division by a boundary-based classifier, according to one aspect of the present disclosure.

Corresponding reference characters indicate corresponding elements among the view of the drawings. The headings used in the figures do not limit the scope of the claims.

DETAILED DESCRIPTION

Figure 1:
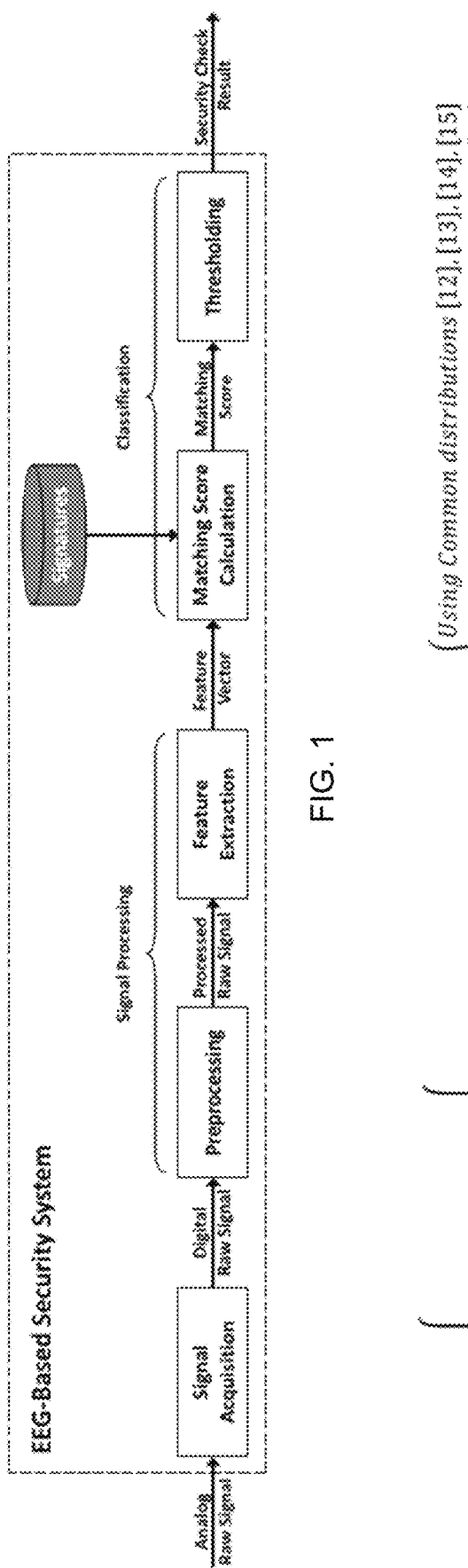
FIG. 1 is a simplified block diagram showing a generic model of an EEG-based security system and possible data injection attack points, according to one aspect of the present disclosure.

Referring to the drawings, embodiments of an analytical framework for security strength and analysis of machine learning based biometric systems are illustrated in FIGS. 1-13.

High signal entropy reduces the performance of the system to match legitimate subject's credentials. As seen in FIG. 1, the goal of BSS is to reduce the data entropy through various processes until achieving a certain security response (e.g. valid or invalid data). For instance, feature extraction methods significantly reduces data dimension that leads to drop in entropy. However, the extracted features still has high variability, and for example in authentication, finding an exact match between returning subjects data and her signature (i.e. her previous stored data) is not possible. So, statistical Machine Learning (ML) techniques are used to calculate the likelihood of matches and decide based on a threshold. Accordingly, different type of data in the BSS has different entropies and levels of vulnerability in each stage, while several research in this area considers system entropy equals to data entropy in a specific stage. For example, prior art systems measure relative entropy of biometric features and matching scores, respectively, that is system entropy in specific cases and not in general. The measurements based on biometric data entropy only indicates the adversary's effort to guess data, without considering processing algorithms on the data, which does not reflect the true strength of the system as a whole. An adversary can craft data completely different from subjects data and get acceptance. In addition, the system strength reported in these works are based on limited data at the training time and does not capture real dynamics of biometric data. At last, data-dependent entropy measurements suffers from: 1) typically biometric data does not follow a determined distribution, and rough estimation of its distribution degrades the accuracy of entropy results, and 2) various bin size and threshold selection methods prevent reaching a consistent entropy analysis method. To avoid these problem, other research evaluates the system strength through simulating the system and possible attacks. However, the security strength measurement results using simulation highly dependent on the simulation configuration both for the system and attack. For instance, in simulating a brute-force attack to the system, the random number generator and its performance play a significant role and most likely vary for each simulation. Besides, simulation is a costly and time consuming method.

From geometrical viewpoint, an ML algorithm divides the biometric dataset (typically features set) from BSS subjects into multiple classes by drawing borders between each pair of subjects' features. In this disclosure, a novel entropy measurement method is disclosed, which calculates the feature domain volume for each subject in whole feature domain to obtain the probability of guessing a feature point in a given subject domain. Indeed, this is a new way of measuring guessing entropy. This method is mainly dependent on processing algorithms such as feature extraction and classification does not convey problems of entropy measurement methods, which are tightly dependent to biometric data, e.g. data distribution estimation and bin size selection.

Furthermore, most security research analyzes their system regardless of adversary's abilities. The security strength measurements in which the adversary's knowledge is not considered is not effective or accurate. For instance, with information about the feature extraction method, the goal of an adversary is to guess a feature vector that can be classified as a subject data by ML. The security strength of BSS can be evaluated by considering the effort of adversary in guessing a legitimate feature vector. This effort not only depends upon the biometric entropy, but also on the feature extraction algorithm and the trained machine. In this disclosure, an analytical framework is disclosed to evaluate BSS strength based on adversary's knowledge about the system. For example, the entropy of the system will be reduced to features entropy, if an adversary has information about the features format (e.g. dimension and range) and feature extraction algorithm. In this case, he can guess feature vectors and reproduce raw data by applying reverse feature extraction algorithm to break the system. In this sense, according to the amount of information available for the adversary, the BSS strength can be estimated.

Finally, although the dimensionality and entropy of features is low in compare with raw data, but it is still high enough to prevent effective learning and configuring a high performance classifier (i.e. curse of dimensionality). So, classifiers cannot perfectly recognize between legitimate and illegitimate data. As known, two images (i.e. "stop" signs) that look almost the same for human eyes can be classified in totally different classes using a trained deep-learning neural network. This means a little changes in data can move the data features out of a class boundary and being classified in another class. This means there might be a trade-off between security strength and performance, which is briefly discussed in the disclosed experiment results section. The outcome is a theory that allows BSS designers to compute the maximum effort by a spoofing attacker to break a Biometric Authentication System (BAS) given its training feature set, the feature extraction technique, and the ML algorithm. The present disclosure indicates the practical manifestation of the theory for five state-of-the-art EAS that use common feature extractors, Power Spectral Density (PSD), Fast Fourier Transform (FFT), Discrete Wavelet Transform (DWT), and Auto-Regression (AR), and ML techniques, Naive Bayes Classifier (NBC), Neural Networks (NNs), and Support Vector Machines (SVMs).

Limited number of research focuses on analyzing vulnerability of biometric security systems against attacks and measuring their security strengths. These works can be studied in two main categories as listed in FIG. 2: 1) data-dependent measurements which consider biometric data entropy, and 2) algorithm-dependent measurements (i.e. guessing entropy) which consider system entropy.

Some research estimates the strength of BSS by measuring the information content of the used biometric data through entropy analysis. An entropy-measuring model has been developed to estimate the number of adversarial guessing effort in BAS. Security strengths of 46 bits for spoken passwords, 69 bits for fingerprints, and 278 to 288 bits for iris features have been reported for BAS. Adler et al. calculate information content between 39 to 47 bits for face recognition features. In their other work, they estimate system entropy based on conditional probability distribution of observing a subject's feature given the distribution of all subjects' feature in the system (i.e. relative entropy of intra- and inter-subject feature distributions). The entropy of biometric systems has been measured by estimating the distribution of matching scores during training classifier. They found out Adler's features entropy is a higher bound for their matching scores entropy.

There are some other works that analyze the operation of biometric systems through simulation which truly shows system strength. Uludag et al. estimates the variability of fingerprints and their results show that by simply representing fingerprints in their pool, the biometric encryption systems are breakable. Attacks such as hill-climbing, shoulder-surfing, and impersonation are more intelligent than the brute force spoofing attack considered in this disclosure. Hence, the security strength shown in this work are upper bounds. A framework for quantitative analysis of machine learning based security systems under the poisoning attack is presented and developed, where an adversary tries to change training data in a way that a trained machine accepts illegitimate input data. Their work analyzes the relationship between the amount of adversary's access to training data and effectiveness of poisoning attack. However, their analysis is limited to centroid based algorithms with simplistic spherical class boundaries. The data perturbation attacks against machine learning based security systems has been discussed, where a feature vector is altered so that it can be located in a desired class domain. Their work is lacks mathematical analysis on the problem and attack effort is not evaluated. Others have developed a generalizable framework for security analysis of machine learning based security systems through simulation. They provide a formal method of test and training data generation but do no analyze the effort and performance trade-off. Although, their security analysis approach through simulation and experiments can provide a reliable estimation of security strength, but suffers from inefficient time complexity and cost which is not suitable for agile design. A formal method based performance analysis of machine learning based security systems has been proposed. Others have studied the detection of training data contamination attacks to intentionally degrade performance. But, their analysis is based on simplistic linear classifiers. Evasion attacks on classifiers has been recently studied and hardening techniques such as convex polytope classifiers have been proposed. However, the analysis assumes attacker effort increases with more complex feature domain and does not provide a mechanism to analyze the performance effort trade-off. Finally, others have formalized the feature selection mechanism in machine learning based security systems as an optimization problem. Their method selects features based on maximizing adversarial effort to manipulate a feature vector to penetrate the system and also the classifier performance. However, adversary's effort is measured through simulation of data perturbation algorithm rather than theoretical analysis. Most of these works measure system security strength either through simulation for practical systems, or theoretically for very simple systems.

The present disclosure provides a theoretical security strength computation for any Biometric Security System (BSS) that uses NNs, NBC, and SVM as the machine learning algorithm given the input signal and feature extraction technique. The security strength depends on the training data set and the feature extraction techniques used for configuring the NNs, NBC, and SVM. The security strength for state-of-the-art EAS was computed using the BCI2000 dataset which consists of 106 subjects. The average security strength varied from 2 to 10 bits for NNs, 33 to 83 bits for NBC, and 1 to 36 bits for SVM. Given such low number of bits, it was concluded that existing EAS that use NNs, NBC, or SVM do not have required security strength to be used standalone in practice. In addition to the above mentioned ML algorithm, the analytical framework can be easily extended to support other types of ML algorithms such as decision tree, and logistic regression.

Analytical Framework of BSS Strength

An analytical framework is disclosed herein for measuring security strength of biometric security systems considering adversary's knowledge about the system. In this way, a generic model, the threat model, and evaluation metrics are described for EEG security systems toward measuring their strength in various adversarial settings. Typically, ESS provide security services through three main security processes: 1) registration, 2) authentication, and 3) identification. In the registration process, an EEG signal sample is obtained from a subject (with identity e.g. subi), the corresponding extracted feature vectors are stored in a database (denoted as signature), and categorized as class subi (e.g. $c_{subi}$) through a training process. During data collection, the subject is asked to be in a specific mental state typically induced by performing a suggested task, which she should repeat it again for every attempts in future. In the authentication process, the returning subject who wants to gain access as a registered subject, provides her identity (e.g. subi), and wears the brain sensor to capture brain signal $S=\{s_1, s_2 \ldots s_n\}$. Then the extracted features from the newly collected data is compared with the signature of subject subi by applying ML techniques. If the system can classify the returning subject in the claimed identity class, then it grants access through a certain response (e.g. yes or no) which has zero entropy. In the identification process, the returning subject again wears the headset and data is collected. The collected data feature is compared with all signatures in the system. If the data feature inside a class boundary (e.g. subi), the class label subi is returned as the identity of the subject which has zero entropy.

EEG Security System Model

This disclosure focuses on ESS as an example of biometric security systems that use boundary-based machine learning to test either an input signal feature belongs to a claimed identity (i.e. authentication) or matches with stored features (i.e. signatures) of any registered subjects in the system (i.e. identification). FIG. 1 shows the generic ESS model and its modules. EEG is a non-deterministic chaotic signal with relatively high sampling rate (e.g. 512 Hz) in a range of 5 to 100 μV, which gives it a high degree of freedom and variability (the uniqueness of EEG as a biometric is due to its high variability). To determine chaotic properties of EEG signals, entropy measurement can be used to represent the randomness of a signal. EEG signals not only have high variability among different subjects, but also are highly variable for a specific subject through time. However, it is expected that intra-subject entropy of EEG to be lower than its inter-subject entropy. The objective of the system is to reduce the entropy of the raw input signal to zero and provide security check responses with certainty: 1) valid/invalid in authentication, or 2) identity/"no match found" for the exposed input signal in identification. However, the used algorithms for entropy reduction are not perfect, and may lead to overlap between subjects' data and mis-recognition, which decay the system performance. As seen in FIG. 1, each processing module in the system model (i.e. signal acquisition, preprocessing, feature extraction, and classification) reduces the entropy of the input signal to some extent:

Signal Acquisition.

Electrical currents through neurons caused by brain activities produce potential differences in the order of microvolts (5-100 μV), which when measured by a sensor result in analog EEG signals. Typically the amplitude of EEG signals are measured by placing EEG electrodes on the surface of the scalp, while a subject is performing a specific mental task. For example, the subject might be asked to think of a specific word, imagine body movement, or simply be in rest state. The signal acquisition module converts the sensed analog signals from a subject into digital format $S=\{s_1, s_2 \ldots s_n\}$ for further processing through computational modules. Typically, the raw signal loses some information (i.e. entropy drops to $E_{sa}$) through the quantization process in analog to digital conversion, EEG signals are usually decomposed in several frequency bands. Each band contains signals associated with particular brain activity: 0.5-3.5 Hz (δ, sleep state), 4-7 Hz (θ, drowsy state), 8-13 Hz (α, relaxation or rest state), 14-30 Hz (β, active concentration and alertness state), 30-100 Hz (γ, perception).

FIG. 12 shows a schema of feature space division by a boundary-based classifier. Matching check tests whether the input data is similar to existing data in the system. In the case of similarity, the input data will be rejected due to possible replay attack.

Signal Processing.

Preprocessing and feature extraction modules form the signal processing phase. After receiving digital raw signals, some preprocessing algorithms such as normalization or filtering are applied on the signal for noise cancellation. During this process, signal may lose some entropy (i.e. entropy drops to $E_{pp}$). Measurement errors, blinking, head motions, and surrounding power sources are some example causes of noise and random changes in brain signals. The next step is feature extraction, where some algorithms such as Power Spectral Density (PSD), Fast Fourier Transform (Fl-rl), Auto-Regression (AR), and Discrete Wavelet Transform (DWT) are applied to extract signal features [28]. A feature extractor $f:D_s \rightarrow D_f$, maps an input signal from an n-dimensional signal domain $D_s$. to an m-dimensional (m<n) feature domain $D_f$, and derives the corresponding feature vector $\{f_1, f_2, \ldots f_m\}=f(\{s_1, s_2 \ldots s_n\})$. Note that the function $f$ is a many to one function, which maps different input signals to one feature vector (can potentially reduce system performance in future), Feature extraction significantly reduces the signal dimensionality and entropy (i.e. entropy drops to $E_{fe}$), that assists classifying signals in the next phase. However, this can potentially open up the system to attacks, which rely on guessing and reproducing brain data.

Classification

Two modules, matching score calculation and thresholding, handle the classification process where, a classifier is trained with legitimate subject's feature vectors, to classify unknown input feature vectors in future attempts. First, an input feature vector is compared with signatures (i.e. stored feature vectors), and their matching score is calculated. Then, based on a threshold, it is decided whether the feature vector and the signature matches or not. The matching score calculation module reduces the input feature vector entropy by mapping it to a single score (i.e. entropy drops to $E_{ms}$), and finally the thresholding module turns the data entropy (i.e. $E_{result}$) to zero by producing a certain response. Eq. 1 (1) shows the data entropy trace in ESS:

$$Eas \rightarrow Eds \rightarrow Eps \rightarrow Efv \rightarrow Ema \rightarrow Eresults = 0 \qquad (1)$$

Figure 3:
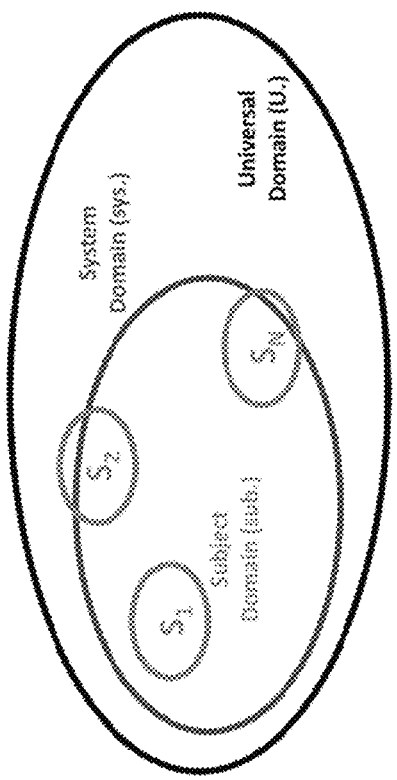
FIG. 3 is an illustration showing a two-dimensional schema of feature domains in ESS, according to one aspect of the present disclosure.

ML techniques are widely used for classification in security systems such as NBC, SVM, and NNs (the focus of this research is on boundary-based classifiers). A trained machine $M(P, \{f_1, f_2, \ldots f_m\})$ partitions the system feature domain ($D_{sys}$) into different classes containing feature vectors for each subject based on the features matching score and thresholds. FIG. 3 illustrates how the machine separates subjects data in feature domain. Assuming a universal set $D_u = \{F_1, F_2 \ldots Flast\}$ contains extracted EEG feature vectors from all living human subjects, then for a specific ESS, $D_{sys} \subseteq D_u$. Subsequently, system feature domain $D_{sys} = D_{sub1} \cup D_{sub2} \cup \ldots \cup D_{subN}$, where N is total number of registered subjects.

The machine $M(P, .)$ uses a parameter set P to decide whether a given feature vector falls in class $C_{subi}$. The parameter set P is derived through a training process. The training process uses signatures and their true labels (i.e. identities), and uses a series of algorithms depending upon the machine $M(P, .)$ to set the parameters P. The trained machine $M^T(P, .)$ gives a matching score ($m_s$) as output, $m_s = M^T(P: \{f_1, f_2 \ldots f_m\})$. The matching score suggests how closely a feature vector resembles a member of a particular class. The most matching class may be the semantically correct class or it can be misclassified depending upon the machine $M^T(P, .)$ performance. There are two classification protocols for security purposes: 1) one-class classification, and 2) binary classification. In the former, a classifier is trained with subject's features during the registration phase to set a surrounding bound for each subject in feature domain (a threshold determine the extension of the bound), The extracted features for each subject are stored as subjects signatures in registration phase. For authenticating a returning subject subi, the classifier acquires her signal feature, and based on her retrieved signature from database, tests whether it lies within class subi boundary ($D_{sub}$) or not. In identification, the classifier tests the input feature using all signatures one-by-one and returns the class label or "match not found" message. In binary classification, during the training process, a classifier sets a border between subject subi feature domain (i.e. subject class $D_{subi}$) and the remaining subjects features in the system (i.e. system class $D_{sys} - D_{subi}$) [29]. For authentication, the new feature vector passes through the trained classifier and recognized as claimed subject data or system data. In identification, the new feature passes through classifier with all N possible combinations of training data ($\forall i \leq N$, $D_{sub_i}$ and $D_{sys} - D_{subi}$), until gets classified as a subject class.

Threat Model and Security Strength

Studies on BSS discuss number of vulnerabilities that are also applicable for ESS. In this disclosure, a focus is made on a type of attacks, also known as spoofing attacks, where an adversary tests fake data at the entry point of the system model (i.e. signal acquisition module) to access the system. Here, an adversary has two choices: 1) reusing snooped data (i.e. replay attack), or 2) guessing and regenerating input data. Replay attack requires complete snooping of data or processed data, and can be blocked by keeping signals history and applying similarity checks between new data and history (i.e. also called fitness check that is applied in preprocessing phase). In the second choice of attack, adversary should reproduce the input data using limited information leakage in system data flow. For instance, if an adversary has information about the digitization, preprocessing, and feature extraction algorithm along with dimension and range of data features, he can start guessing feature vectors, and regenerating the input data by applying the reverse algorithms.

Threat Model.

The threat model is discussed with particular reference to ESS. However, the threat model is applicable for BSS in general. In the present disclosed threat model (FIG. 4), the following characteristics of an adversary are assumed:

a) The adversary can only access the system by providing an analog EEG signal as input. Hence, for example, even if the adversary guesses a signal feature, it has to be converted to analog EEG format before the adversary can attempt a spoofing attack.

b) An adversary only makes random guesses of data in a search domain (i.e. with uniform distribution), where more information about the domain increases his chance for a successful guess. In the other terms, he starts with guessing all possible combinations until receiving a positive response from the system (i.e. also known as brute force attack).

c) The ESS employs a fitness check algorithm to thwart replay attacks. In this component, as an example, the ESS compares the extracted features $\{f_1, f_2 \ldots f_m\}$ from an input signal with all the past used features in the system $\{f_1^T, f_2^T \ldots f_m^T\}$ to see if the normalized root mean square deviation between $\{f_1, f_2 \ldots f_m\}$ and $\{f_1^T, f_2^T \ldots f_m^T\}$ is less than a threshold $T_h$. If it is less than $T_h$, then it rejects the input as a potential replay attack.

d) Data leaked information includes precision, dimension, and range of data, and algorithm leaked information has detailed functionality of a given algorithm.

The main objective of the adversary is to obtain a signal $\{x'_1, x'_2, \ldots x'_n\}$ such that its resulting feature vector: a) avoids fitness check rejection, and b) classifies itself in a target subject class $c_{subi}$.

Evaluation Metrics.

Figure 2:
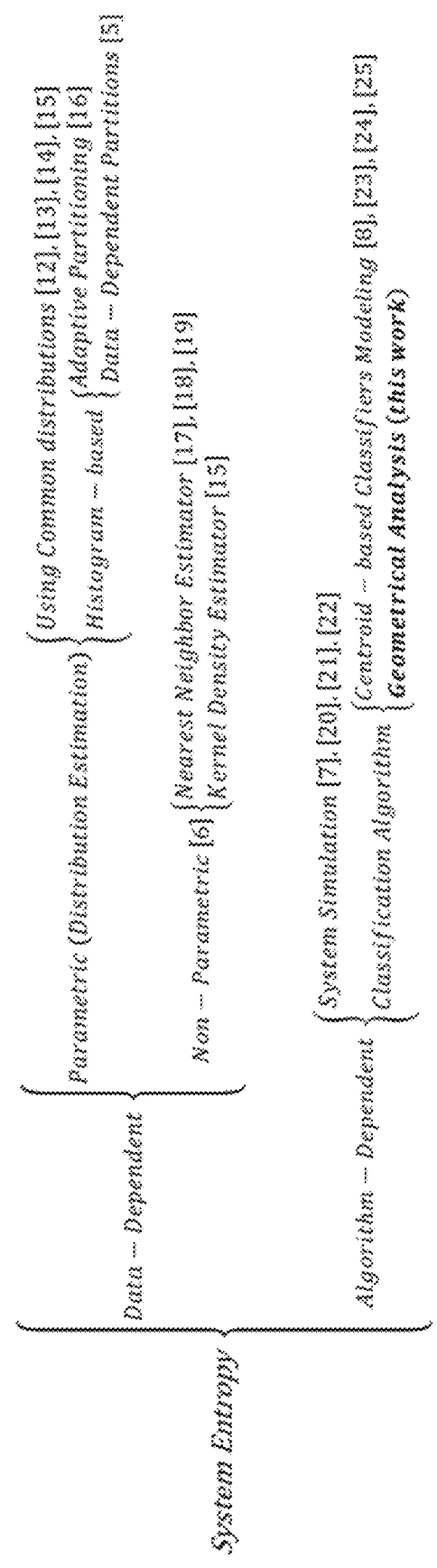
FIG. 2 is a taxonomy of measurement methods for system entropy, according to one aspect of the present disclosure.

Entropy can be used as a metric of ESS security strength. As noted above, entropy measurement methods can be divided into two categories. Data-dependent methods estimates system entropy based on data distribution. For example, known methods measure relative entropy using conditional distribution of observing each subject feature given all the subjects features in the system. However, like most data-dependent methods, they use a common distribution model (i.e. Gaussian) to present the biometric features, which does not provide accurate entropy results. To avoid these kind of problems in data-dependent measurements, an algorithm-dependent methods are used in the framework of the present disclosure. Here, the system strength is defined as the base 2 logarithm of average number of guesses to break the security system, also known as guessing entropy. In this disclosure, a novel geometrical method is disclosed to calculate the average number of guesses. In this method, as shown in FIG. 2, class boundaries for each subject in feature do-main are calculated considering their spatial distribution and volume in Euclidean space. The probability of guessing a feature vector in a given subject domain for authentication is calculated by $P_{auth} = (1/N) \Sigma_{i=1}^{N} (V_{S_i}/V_{sys})$ where $V_s$ and $V_{sys}$ indicate the volume of subject and system domains, respectively (N is the total number of registered subjects in the system). For identification, an adversary can guess a feature vector in any subject class, so the guessing probability will be $p_{rd} = \Sigma_{i=1}^{N}(V_{S_i}/V_{sys})$. In general, considering these formulas, the average number of guesses in system domain, to guess a feature vector in subject domain can be calculated using mean in geometric distribution (i.e. Average Guesses=$\frac{1}{p}$), The geometrical guessing entropy calculation can be applied on any data domain such as feature or matching score domains, and leads to various entropy results. In this sense, system strength will be a dynamic variable which is highly related to amount of adversary's knowledge about the system data flow and intermediate processes. FIG. 1 indicates critical points in the given system model, where some information is available for the adversary through information leakage. As mentioned herein, each processing algorithm in ESS attempts to reduce the initial EEG data entropy to reach a certain security response as shown in Eq. 2:

$$E_{as} \geq E_{ds} \geq E_{ps} >> E_{fv} >> E_{ms} >> E_{result} = 0 \quad (2)$$

Adversary's Knowledge.

There are some possible combination for adversary's knowledge in practical ESS and their corresponding attacks. For instance, an adversary having information about the feature vectors can guess vectors in a domain with $2^{E_{fv}}$ size, rather than infinite domain. But, without any information about the feature extraction algorithm, he cannot regenerate the initial EEG signal from his guessed feature, so he can only guess in signal domain with $2^{E_{ds}}$ size and the system entropy will be $E_{ds}$ which is very high. However, with information about the feature extraction algorithm, an adversary can apply its reverse algorithm, where system entropy will be $E_{ds}$. As a practical example, with access to Is digital raw signal (with 160 Hz sampling rate and two digits of precision), the adversary should guess 160 samples in a range from 5.00 to 100.00 µV. So, for brute-force guessing, the size of the search domain is huge (i.e. equal to 9500 power 160) and impossible to break. However, by accessing to alpha band (8-13 Hz) signal features, the adversary only need to guess 6 sample points in a range from 0.00 to 6000.00, where the search domain is much smaller and more vulnerable to brute-forcing. In ESS with reversible processing algorithms, the security strength of the system is equal to the lowest guessing entropy in the data flow. While, in systems with irreversible processing algorithms, for example, even if irreversible features are guessed, an input data that has the same irreversible features cannot be generated. So, the security strength will be maximum and equal to guessing entropy of analog EEG data. It is noteworthy that in a system with combination of reversible and irreversible algorithms, system strength is equal to the guessing entropy of the input data to the first irreversible algorithm. BSS entropy is estimated using matching score distribution. According to our threat model, with information about matching score calculation and feature extraction algorithms, an adversary can reproduce raw EEG from matching score by applying reverse algorithms and system entropy will be equal to Ems. Nonetheless, not all algorithms are reversible, and this case is equivalent to the situation, when there is no information available about the algorithm. In their research, they prove that Adler's system entropy is an upper bound for their measurement method, which makes sense based on our framework. Because, typically, data loses information by converting from feature vector to matching score. They show that if matching scores distribution can be mapped to features distribution (i.e. $E_{fv} = E_{ms}$), the system entropy will be maximized and equal to Adler's entropy (i.e. not necessarily true all the time). According to Table 5, it is seen that system entropy cannot be studied without considering the amount of adversary's knowledge. In our threat model, the maximum system entropy is infinity, where the adversary has no information about the system or his gained information is not useful (he should guess an unknown size vector in infinite real numbers domain). And, the minimum entropy is $E_{ms}$, where adversary should at least has information about matching score and its calculation algorithm along with feature extraction algorithm. Although, in theory, the minimum entropy can drop to zero (i.e. breaking the system in one guess) with complete knowledge about the ESS data and algorithms, which is not a usual case.

Security Analysis of ESS

The security analysis of ESS involves determination of the effort of an adversary in crafting an EEG signal that is accepted by the ESS. We will theoretically evaluate the effort for the adversary to guess an EEG signal such that it is accepted by the authentication algorithm. As disclosed herein, a framework is used to evaluate the effort of the adversary in breaking the EAS system as an example ESS.

Fitness Check for Immunity to Replay Attack

Figure 4:
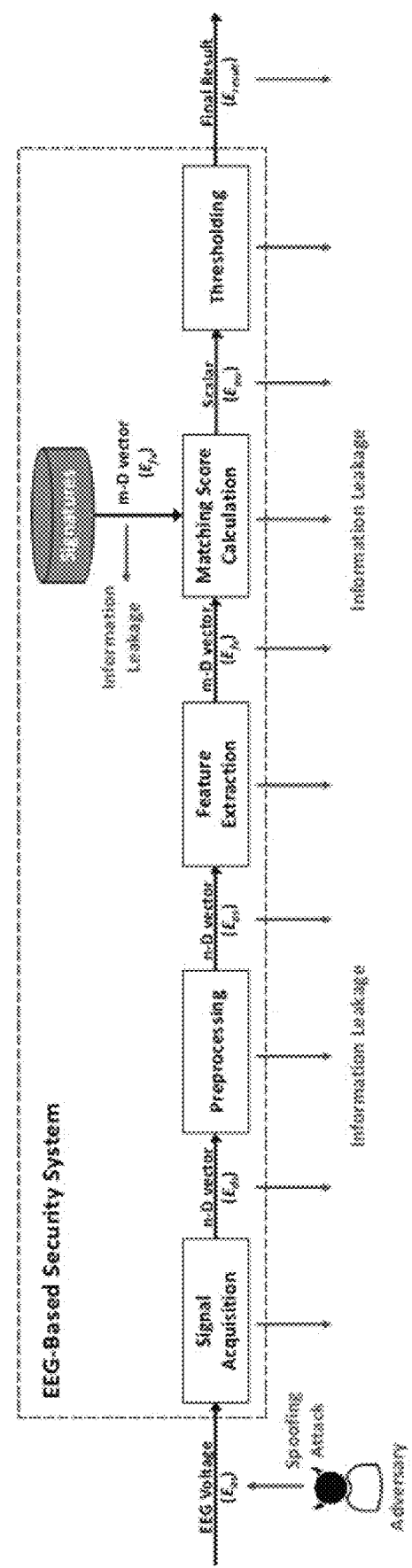
FIG. 4 is a simplified block diagram showing a threat model for the ESS, according to one aspect of the present disclosure.
Figure 5:
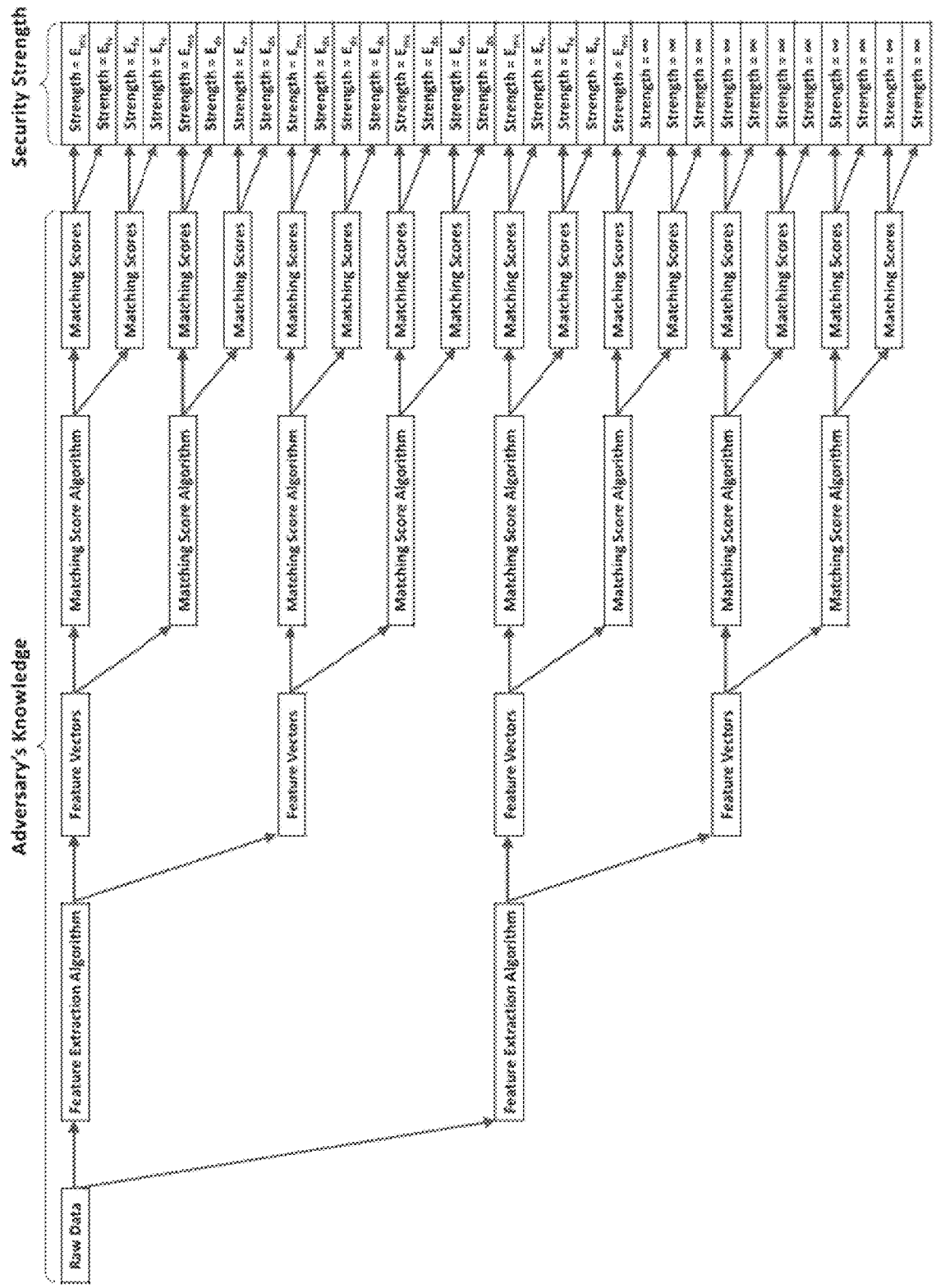
FIG. 5 is an illustration showing system security strength (guessing entropy) based on an adversary's knowledge, according to one aspect of the present disclosure.

As noted above, in order to reduce the chance of replay attacks an additional checkpoint between feature extractor and classifier is required (FIG. 4). In this checkpoint, the Normalized Root Mean Square Deviation (NRMSD) between signature and input signal of the claimed identity is calculated. If the fitness is greater than a threshold, signal will pass the check. Otherwise, it's assumed that the input signal is manipulated version of stolen signals. NRMSD is calculated according to Eq. 3:

$$NRMSD(X, \hat{X}) = 1 - \frac{\sqrt{\frac{1}{N}\sum_{i=1}^{N}(x_i - \hat{x}_i)^2}}{\overline{X}} \quad (3)$$

where $\hat{x}_i$ is the manipulated value of the sample $x_i$ from the original signal X, N is the number of samples for comparison, and $\overline{X}$ is average over sample values in original data-series. NRMSD changes from minus infinity to one, where obtaining one indicates two given signals are identical and smaller values are interpreted as more difference between signals. The EAS system automatically rejects an input if the NRMSD between the input and any of the training point is less than a threshold $\in$. A signal with relatively high NRMSD can bypass the fitness check of the system and attack the other components. Geometrically this means that around each training point $\{f_1^d, f_2^d, \ldots f_m^d\} \in D_f$ there is an m dimensional hypersphere with its center at $\{f_1^d, f_2^d, \ldots f_m^d\}$ and radius $d_r$, given by Eq. 4, such that any point inside the hypersphere is automatically rejected by EAS to avoid replay attack.

$$d_r = (1 - c)\sqrt{\sum_{i=1}^{m}\left(f_i^d - \frac{\sum_{i=1}^{m}f_i^d}{m}\right)^2} \quad (4)$$

Matching Check

After fitness checking, the input signal goes through the classifier to see if it can be classified in a same class as a legitimate subject. An input signal is accepted as a legitimate subject signal, if the matching score of belonging to subject class is higher than the score of belonging to system class. Geometrically this means that the classifier divides the feature domain into two classes depending on the matching score. Let us consider that $V_{sys}$ is the total volume of the sub-domain from which the adversary can choose a point and $V_{sub}$ is the volume of the feature domain dedicated to the subject class $C_{sub}$. For a successful spoofing attack on the BAS the attacker has to satisfy the following conditions:

a) It has to choose a feature vector that lies inside $V_{sub}$, and b) While choosing the feature vector it has to avoid the areas covered by the hypersphere of radius $d_r$ surrounding each training point. If we assume that $V_d^s$ is the volume of the hypersphere with the $d^{th}$ training point at its center, then the success probability of the adversary is given by Eq. 5:

$$\mathcal{P}_{auth} = \left(V_{sub} - \sum_{\forall d \in T_D} V_d^s\right) / V_{sys} \quad (5)$$

where $T_D$ is the training dataset used for the ML algorithm. $V_d^s$ can be computed from standard hypersphere volume computation equations [32]. According to the mean of Geometric distribution, the total effort of the adversary is equivalent to brute forcing a K bit key given by the following equation—

$$K = \log_2(1/\mathcal{P}_{auth}) = \log_2\left(\frac{\prod_{i=1}^{m} q_i}{V_{sub} - \sum_{\forall d} \frac{\pi^{m/2} d_r^m}{\Gamma\left(\frac{m}{2}+1\right)}}\right). \quad (6)$$

The computation of the volume $V_{sub}$ is highly dependent on the ML algorithm. ML algorithms can be divided into two classes based on how they divide the feature domain into subject and system class: a) linear classifiers, where the ML divides the feature domain using a hyperplane, examples include linear SVM, decision tree, logistic regression and b) non-linear classifiers, where the ML divides the feature domain using curved surfaces, examples include NBC, kernel SVMs, and NNs. The feature domain is considered as a hypercube whose sides $q_i$ in each dimension i is determined by the minimum and maximum possible feature values. The problem then boils down to finding intersection of hyperplanes and curved surfaces with hypercubes. The linear ML classifiers are easy to analyze, but the non-linear ones are difficult. The computation of $V_{sub}$ is shown for two nonlinear MLs, NBC and kernel SVM in this disclosure and discuss on how to use the same approach for other boundary-based classifiers.

Naïve Bayes Classifier.

Given a feature vector $\{f_1, f_3, \ldots f_m\}$, the two class NBC classifier computes the probability of each feature point to come from subject class $\{c_j$ or $c_k$ (i.e. the system class). If the probability $p(\{f_1, f_2, \ldots f_m\}|c_j) > p(\{f_1, f_2, \ldots f_m\}|c_k)$ then the machine $M^T(P, .)$ will classify the input data as $c_j$. The training phase of NBC considers a training data set $T_D$, which consists of a set of feature vectors belonging to class $c_j$, and another set of features belonging to class $c_k$. The NBC machine computes the mean $\{\mu_i^j, \mu_i^k\}$ and standard deviation $\{\sigma_i^j, \sigma_i^k\}$ for each feature component $f_i$ of the feature vector and considers a Gaussian probability distribution for class $c_j$ and $c_k$. Hence, given a feature vector $\{f_1, f_3, \ldots f_m\}$, the probability that the feature is from class $c_j$ is given by—

$$\mathcal{P}(\{f_1, f_2, \ldots f_m\} | c_j) = \prod_{i=1}^{m} \frac{1}{\sqrt{2\pi\sigma_i^{j^2}}} \exp\left(\frac{-(f_i - \mu_i^j)^2}{2\sigma_i^{j^2}}\right) \quad (7)$$

If the $2\sigma_i^j/\sqrt{m}$ interval is considered in each dimension, then 95% of all feature points that are in class $c_j$ will fall inside the resulting ellipsoid with the center at $\mu_i^j$ in each dimension and half axes length of $2\sigma_i^j/\sqrt{m}$ in dimension i. This ellipsoid is referred to as the 95% ellipsoid. The 95% ellipsoid for the class $c_j$ and the system model is shown in 2 dimensions in FIG. 6. A new input feature point is accepted, if the probability of the data coming from cj (Eq. 7) is greater than that of coming from ck leading to condition in Eq. 8.

$$\prod_{i=1}^{m} \frac{1}{\sqrt{2\pi\sigma_i^{j^2}}} \exp\left(\frac{-(f_i - \mu_i^j)^2}{2\sigma_i^{j^2}}\right) - \quad (8)$$
$$\prod_{i=1}^{m} \frac{1}{\sqrt{2\pi\sigma_i^{k^2}}} \exp\left(\frac{-(f_i - \mu_i^k)^2}{2\sigma_i^{k^2}}\right) \geq 0$$

The equality gives us the class boundary for the class $c_j$. Hence, if an adversary can guess a feature point that lies inside the 95% ellipsoid while satisfying the Eq. 8, he will be successful in breaking the EAS.

Estimation of Intersection Volume:

The intersection plane described by Eq. 8 can take various forms such as hyperboloidal or ellipsoidal surfaces.

Hyperboloidal Surface:

Eq. 8 may describe an m dimensional hyperboloidal surface with the $i^{th}$ dimension of the center $e_i^j$ given by Eq. 9 and half axes lengths in each dimension $r_i^j$, given by Eq. 10.

$$e_i^j = \left(\sigma_i^{k^2}\mu_i^j - \sigma_i^{j^2}\mu_i^k\right) / \left(\sigma_i^{k^2} - \sigma_i^{j^2}\right). \quad (9)$$

$$r_i^j = \sqrt{\frac{-2\sigma_i^{k^2}\sigma_i^{j^2} \sum_{i=1}^{m}\left[\ln\left(\frac{\sigma_i^k}{\sigma_i^j}\right) - \frac{(\mu_i^k - \mu_i^j)^2}{(\sigma_i^{k^2} - \sigma_i^{j^2})}\right]}{(\sigma_i^{k^2} - \sigma_i^{j^2})}}. \quad (10)$$

Figure 6:
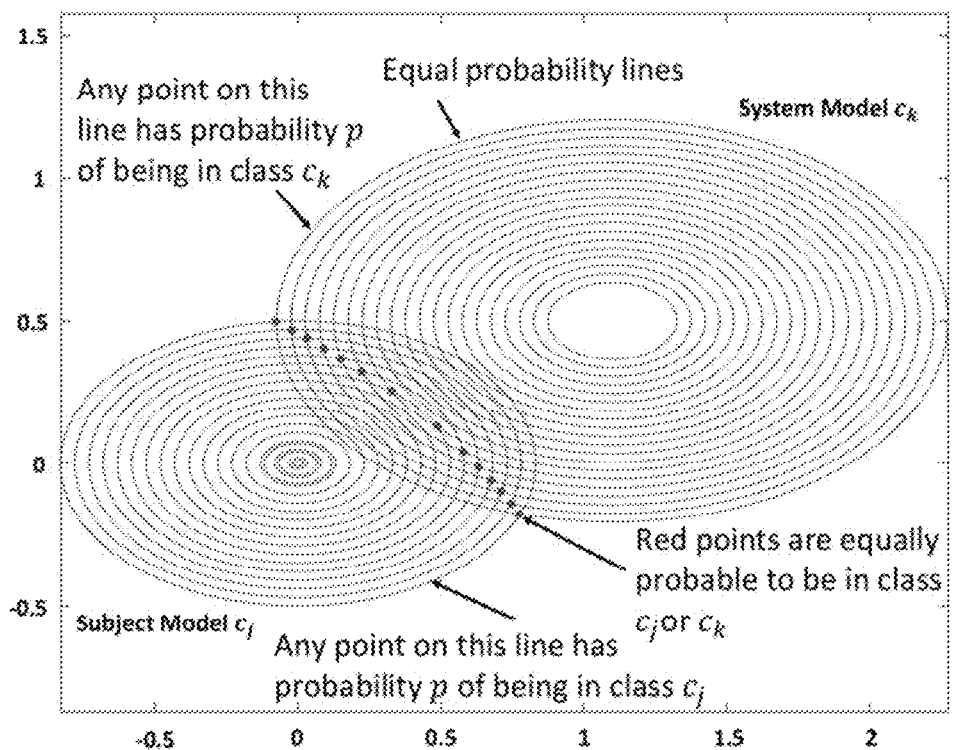
FIG. 6 is an illustration showing a top view of a data model distribution in two dimensions, according to one aspect of the present disclosure.
Figure 7:
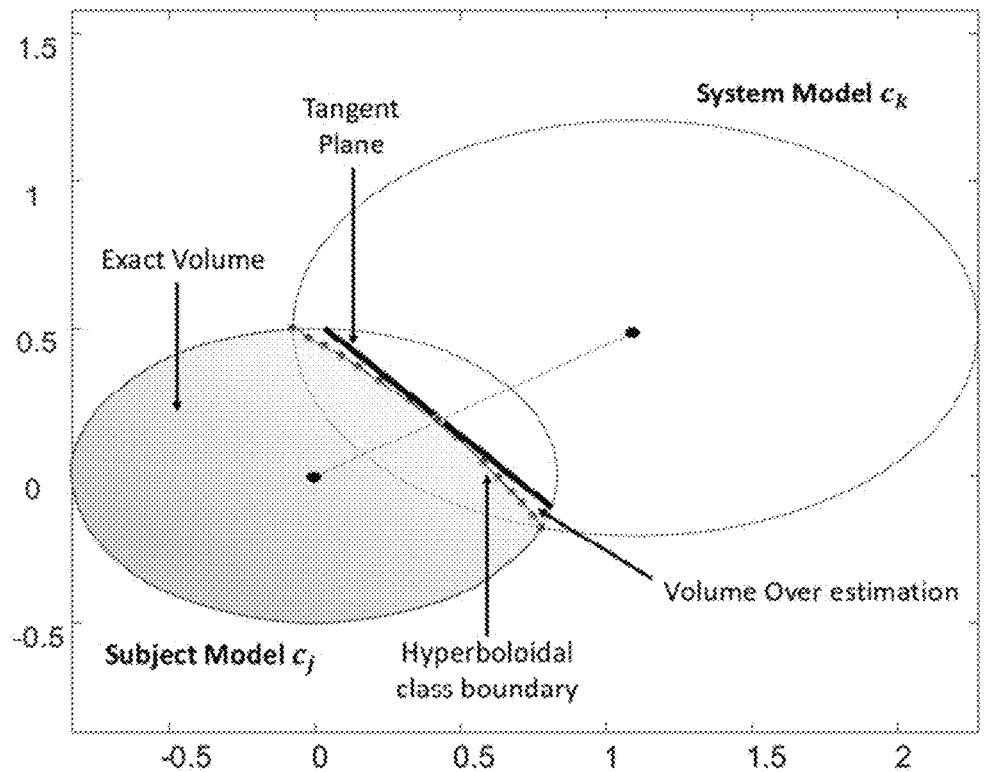
FIG. 7 is an illustration showing an approximation of the volume of intersection of the ellipsoid and hyperboloidal class boundary in two dimensions, according to one aspect of the present disclosure.
Figure 8:
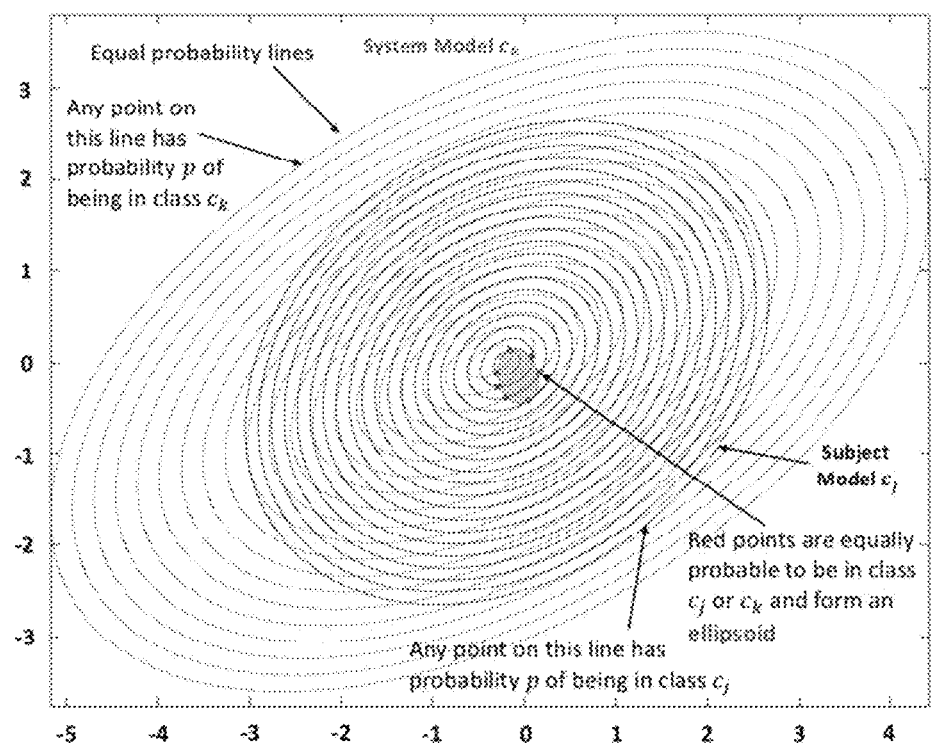
FIG. 8 is an illustration showing an intersection ellipsoid of two classes in two dimensions, according to one aspect of the present disclosure.

The hyperboloidal domain is shown in 2-D (which becomes a hyperbola) in FIG. 6. The volume in which a feature point should fall such that it is classified by the NBC machine as $c_j$, is the shaded area (FIG. 7) of the intersection of the 95% ellipsoid with the hyperboloid having the parameters in Eq. 9 and 10. Determination of intersection volume of an ellipsoidal volume and a hyperboloidal plane is difficult, Instead we consider an approximation as shown in FIG. 7. There are two methods of approximation, a) we can consider intersection of the tangent hyperplane of the hyperboloid with the ellipsoid, or b) we consider the points of intersection of the hyperboloid with the circumference of the ellipsoid and draw a hyperplane through these points. The first approach gives an over-approximation of the intersection volume, while the second approach gives an under approximation. An over approximation under estimates the adversary's effort, while an under approximation over estimates it. In this disclosure, an under estimation of the adversary effort is considered. For this purpose, we consider the point on the hyperplane where it intersects the straight line connecting the two centers of the two 95% ellipsoids for class $c_j$ and the system model as shown in FIG. 7. The equation of the straight line connecting the two centers of the ellipsoid is given by Eq. 11.

$$(x_i - \mu_i^j)/(\mu_i^k - \mu_i^j) = (x_q - \mu_q^j)/(\mu_q^k - \mu_q^j), \quad (11)$$

where i and q are two independent dimensions. There are m−1 such equations and the intersection point can be obtained by substituting x., in terms of $x_i$ into Eq. 8. For the dimension i, the intersection point $f_i^{int}$ is given by Eq. 12.

$$\frac{(f_i^{int} - e_i^j)^2}{r_i^{j2}} + \sum_{p \neq i} \frac{\left(\mu_p^j + \frac{\mu_p^k - \mu_p^j}{\mu_i^k - \mu_i^j}(f_i^{int} - \mu_i^j) - e_p^j\right)^2}{(r_p^j)^2} = 1. \quad (12)$$

We need to estimate the tangent hyperplane of the hyperboloid in the form of Eq. 13.

$$p_1 f_1 + p_2 f_2 + \ldots p_m f_m = \rho, \quad (13)$$

where pi are the normal vectors of the hyperplane and p is the distance of the hyperplane from the origin. If the hyperboloid is considered to be made of one sheet, then the $m^{th}$ dimension coefficient is considered negative. Then, the normal vector of the tangent hyperplane and its distance from origin is given by Eq. 14.

$$p_i = \frac{2(f_i^{int} - e_i^j)}{r_i^j \sqrt{\sum_{i=1}^{m} 4(f_i^{int} - e_i^j)^2 / r_i^{j2}}}, \quad (14)$$

$$\rho = \sum_{i=1}^{m} \frac{2 f_i^{int}(f_i^{int} - e_i^j)}{r_i^j}.$$

The intersection volume of the hyperplane described by Eq. 13, and 14, and the 95% ellipsoid is then given by Eq. 15.

$$V_{sub} = \frac{(\kappa \pi)^{(m-1)/2}}{\Gamma((m+1)/2)} \cdot \frac{\prod_{i=1}^{m} 2\sigma_i^j \sqrt{m}}{\sqrt{\sum_{i=1}^{m} 4\sigma_i^{j2} m p_i^2}}, \quad (15)$$

where k is given by Eq. 16.

$$\kappa = 1 - \frac{\rho^2}{\sum_{i=1}^{m} 4\sigma_i^{j2} m p_i^2}. \quad (16)$$

Ellipsoidal Plane:

Eq. 8 may also describe an ellipse (FIG. 8) with center at $e_i^j$ given by Eq. 9 and half axis length given by Eq. 10 depending on the type of features in the training dataset. The volume of the m-dimensional ellipsoid is given by Eq. 17, $$V_{sub} = \frac{2\pi^{m/2}}{m\Gamma(m/2)}\left(\prod_{i=1}^{m} r_i^j\right). \quad (17)$$

Support Vector Machines.

Figure 9:
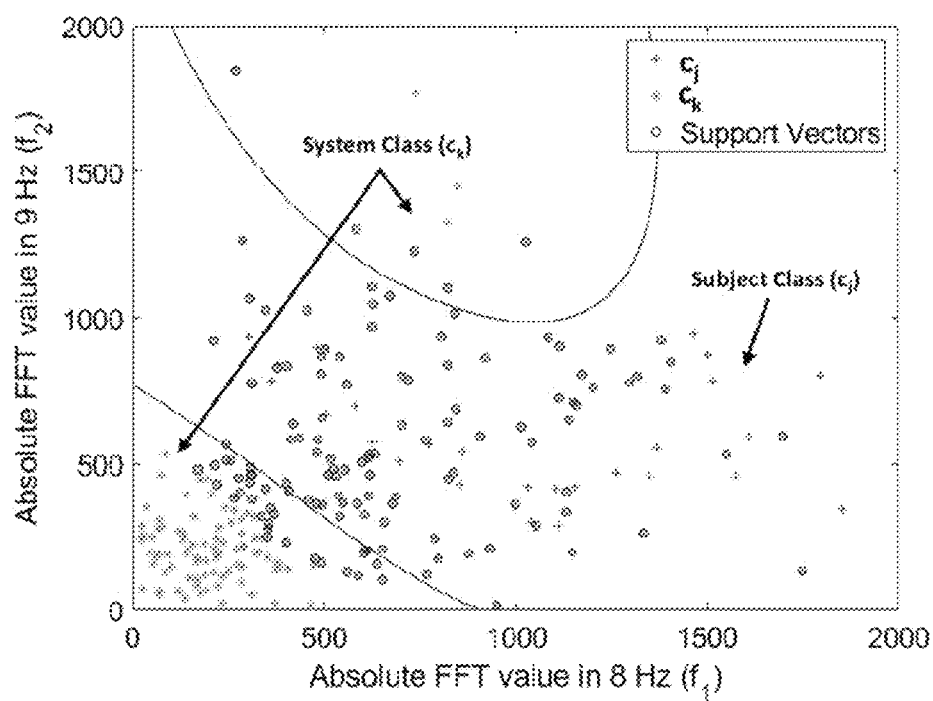
FIG. 9 is a graphical representation showing SVM boundaries for two dimensional FFT features, according to one aspect of the present disclosure.

In binary classification using SVMs, the main idea is to find a border between data of two classes, which keeps the maximum distance from both classes data points. For authentication, SVM is trained considering a training data set $T_D$, which consists of a set of feature vectors from $c_j$ and $c_k$. Through an optimization process in the training phase, SVM selects some data points (usually on the boundaries of the class) from both classes $S_i = \{f_{i1}, \theta_{i2} \ldots f_{in}\}$ also known as support vectors, to estimate the parameters of the target border surface. This surface divides the feature domain into the two sets, $c_j$ and $c_k$, as seen in FIG. 9. At last, the decision making module can recognize the class of a feature vector $\{f_1, f_2, \ldots f_m\}$ by checking which side of the border it is located. In some cases, with a tightly intertwined dataset kernel methods can be exploited to map data to another domain where hopefully data is more separable. For instance, as seen in FIG. 9, a third order polynomial kernel is applied to estimate the boundary surfaces between subject and system data. Linear, polynomial, radial basis function, and multilayer perceptron, are common kernel methods that assist SVM for classification. At the end of training, SVM derives the following equation:

$$m_s = \sum_i \alpha_i k(S_i, \{f_1, f_2, \ldots f_m\}) + b \quad (18)$$

where i, ($x_i$, k, and b denote, number of support vectors, weights, kernel function, and bias, respectively. If $m_s > 0$, $m_s > 0$, $\{f_1, f_2, \ldots f_m\}$ is recognized as $c_j$, or otherwise is classified in $c_k$. It is noteworthy that ms=0 means that the data point is exactly on the separator m-dimensional surface. To measure the number of efforts needed for guessing a feature vector in the subject class, we need to calculate the intersection volume between the surface and the whole feature range Df (i.e. a hypercube). For a feature vector with values between 1 to $q_i$ and dimension m, the whole feature domain is a hypercube with volume equal to $$\prod_{i=1}^{m} q_i$$

Figure 10:
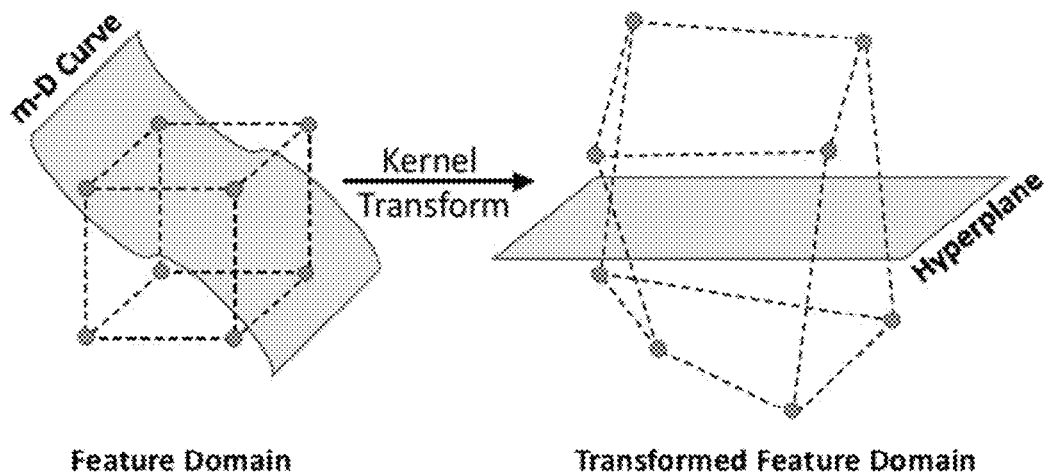
FIG. 10 is an illustration showing a three-dimensional visualization of kernel transform, according to one aspect of the present disclosure.

Estimation of Intersection Volume of System Domain and SVM Boundaries:

Estimation of the intersection volume of an m-dimensional surface and a hypercube is a complex problem, and depends on the angle the surface cuts the hypercube (which is ultimately intractable in higher dimensions). For the linear SVM, the problem is much simpler since Eq. 18 represents a hyperplane. Intersection of hyperplane with a cube has been studied by many computational geometry researchers. Problem arises when the kernel function is nonlinear. The purpose of using a kernel function in SVM was to transform the data set into another domain and find a dividing hyperplane (rather than m-dimensional surface) to separate transformed feature vectors in a transformed domain (FIG. 10). The kernel method of SVM emulates this transformation in the kernel function, where $k(S_i, \{f_1, f_2, \ldots, f_m\}) = \phi(S_i) \odot \phi(\{f_1, f_2, \ldots f_m\})$ where $\odot$ denotes the dot product of two vectors. Typically, SVMs in using kernel methods do not need explicit representation of the function $\phi(\ )$. However, in our security analysis, if we know $\phi(\ )$, then we can transform the hypercube representing the feature domain using $\phi(\ )$. This makes it easier to find the volume since the SVM classification finds a hyperplane instead of a surface in the transformed feature domain.

To approximate $\emptyset(.)$ from the kernel function, we use the Nyström method [36]. The function $\emptyset(.)$ can result in a concave feature domain. For the purpose of security strength measurement we can consider a convex hull over approximation of the volume of the concave feature domain. This over-approximation means that the attacker has more legitimate points to choose from. Hence the security strength obtained from such an analysis is an under estimation.

To calculate the intersection volume of a hyperplane and a convex hull we first consider the hull points and divide them into two classes (subject and system) depending upon which side of the hyperplane they lie on. We then draw straight lines from one hull point in subject class to all other hull points in the system class. We consider the intersection points of the straight lines with the SVM support hyperplane. The convex hull of the intersection points and the hull points in the subject class form the over-approximated feature domain for the subject class. Finally, convhulln function in MATLAB is applied to calculate the volumes of rn-dimensional convexes.

Decision Tree, Logistic Regression, and NNs.

Besides NBC and SVM, Decision Tree (DT), Logistic Regression (LR), and NNs are the fundamental ML algorithms. In DT, in each stage of the algorithm, data is split up into two parts according to a selected feature from feature vector. Through a training process, a feature is selected that can separate the two classes with the lowest number of misclassification. So, at the end, if the feature domain is considered as a hypercube, the subject class will be smaller hypercube inside the feature domain. By finding the volume of the hypercubes, we can measure number of adversary's effort. In LR, similar to SVM with linear kernel, a hyperplane is found to separate subject and system classes data. In this way, the logistic function, $f(z) = 1/(1+e^{-z})$ is used to map each feature vector to a value between 0 to 1 in a two dimensional domain. In the new domain, a vertical line can split the classes data, that is appeared as a hyperplane in the origin domain. By finding the intersection volume of the hyperplane and feature domain hypercube, number of adversary's effort can be obtained. Finally, NNs can be studied as an extended version of LR methods, where an input feature vector is mapped to 2 dimensions and a transfer function decides its class. Through training phase, a vector of weights are set, and the inner product between input and weight vector is plugged into the transfer function as input. Similar to LR, the intersection volume of a hyperplane and a hypercube leads us to number of adversary's effort.

Security Measurement of EAS

In this disclosure, the trade-offs are determined between security strength and system performance for the various feature extraction algorithms (the ML algorithm is fixed to be NBC). Security strength of five state-of-the-art EAS (Table 1) is measured for different ML algorithms using EEG dataset available on-line.

Experimental Setup

In the experiment, raw EEG signals provided by the developers of the "BCI2000" system are used (i.e. a general purpose Brain Control Interface (BCI) system). This dataset contains data from 106 subjects collected through 64 channel electrodes with sampling rate of 160 Hz. In our experiment, we choose signals from three 1-min sessions of opening and closing left or right first for each of 106 subjects. According to the International 10-20 System, "C3" and "C4" are the optimized channels to distinguish left motor imageries from right ones. So, signals from channel "C3" are expected to show more inter-subject variability, and we choose it for our experiment. For preprocessing, only zero-mean and unit-variance are performed on the data. The EAS is tested using three types of features, FFT, DWT, and AR (these are fundamental feature extractors and wide range of features such as PSD are derived using these extractors). These features are extracted from one minute (sixty seconds or 60×160=960 data samples) of the first session of the EEG data for each subject. Feature extraction methods are applied on each second of data, so there will be 60 feature vectors at the end for each subject. In FFT, we use absolute value of Fourier transform outputs from 8 to 13 Hz which indicates a band and contains 6 feature points (i.e. 6 dimension feature vector). In DWT, a fourth level wavelet transform is applied on signals and the size of the output feature vectors is 11. To obtain auto-regression weights, seventh order AR is applied on signals which result in 8 dimension feature vectors.

EAS Simulation

The generic model of an EAS was described above and FIG. 4. In the registration phase, 60 s data were used from session 1, to extract features and store it in database for all 106 subjects, separately. So, the database contains 60×106=6360 feature vectors. In the authentication phase, 60 s data from session 2 were used to test the system. After extracting features from the test data, for fitness checking, NRMSD was measured to prohibit the usage of identical or almost similar samples in authentication attempts. In matching check, the classifier is trained with features in database, 60 feature vectors related to the claimed identity is used for subject class and the rest of feature vectors (60×105=6300) form the system class.

TABLE 1

Security analysis of NN-based ESS.

| Domnin | DIM* | NSB* (theory) | NSB (simulation) | HTER |
|---|---|---|---|---|
| FFT (θ band) | 4 | 5.02 | 4.92 | 0.29 |
| FFT (α band) | 6 | 3.91 | 3.74 | 0.30 |
| FFT ($\beta_{1,2}$ bands) | 7 | 2.70 | 2.37 | 0.29 |
| AR (8th order) | 8 | 10.33 | 9.10 | 0.29 |
| FFT ($\beta_3$ band) | 10 | 2.29 | 1.73 | 0.29 |
| DWT (level 4) | 11 | 8.10 | 8.08 | 0.29 |

*DIM stands for demension and NSB Number of Security Bits.

TABLE 2

EAS Security strength (0.95 fitness threshold).

| Reference | Feature | Dimension | Classifier | NSB | HTER |
|---|---|---|---|---|---|
| [40] | FFT | 6 | NBC | 33 | 0.38 |
| [41] | PSD | 9 | NBC | 83 | 0.46 |
| [2] | PSD | 7 | SVM | 1 | 0.23 |

TABLE 2-continued

EAS Security strength (0.95 fitness threshold).

| Reference | Feature | Dimension | Classifier | NSB | HTER |
|---|---|---|---|---|---|
| [3] | DWT | 11 | SVM | 1 | 0.38 |
| [42] | AR | 8 | SVM | 36 | 0.22 |

* NSB for Number of Security Bits.

The experiment measured the security strength of an EAS which apply NNs and common feature extraction algorithms using both our geometrical method and simulation as seen in Table 1. Also, a five state-of-the-art ESS systems was set up which apply NBC and SVM as classifier to measure their strength (Table 2). Using NBC, 2×m Gaussian models are estimated, that is m models for each class, where m indicates the length of feature vector. In NNs and SVM, an m-dimensional separator surface is estimated based on the training data. The whole test data containing both subject and system class data is applied to the trained classifier, one feature vector at a time. In NBC, according to the models, the likelihood of belonging to each class (either subject or system class) can be calculated. Also, in NNs and SVM, depending on the spatial position of the vector considering the separator surface, its class is determined. It's expected that a perfect classifier recognizes test data related to legitimate subject as the subject class and the remaining test data as the system class. Furthermore, the simulation results of EAS (which use NNs as classifier) strength against spoofing attack (Table 1) validates our theoretical approach. For simulating the spoofing attack, random values are generated that follow uniform distribution in an interval from minimum to maximum of the training data values (feature bounds). These random values form test feature vectors as input to the trained NNs classifier. In each simulation trial, the feature vector generation continues until finding a vector that is classified as a subject class. The total number of iterations to guess input data and receive success response from the classifier is the number of adversarial effort to break the system. The simulations are run for all 106 subjects (each time one subject data is considered as data of the claimed identity and the rest is assigned to system class) in thousand trials. Table 1 lists the average number of security bits through simulation. The security strengths of EAS measured by our theoretical method is slightly higher than security strength results based on simulation, for all type of features. By increasing the number of simulation trials, it is expected that simulation NSBs converge to theoretical NSBs. The simulation results validate the reliability of our theories.

Figure 11A:
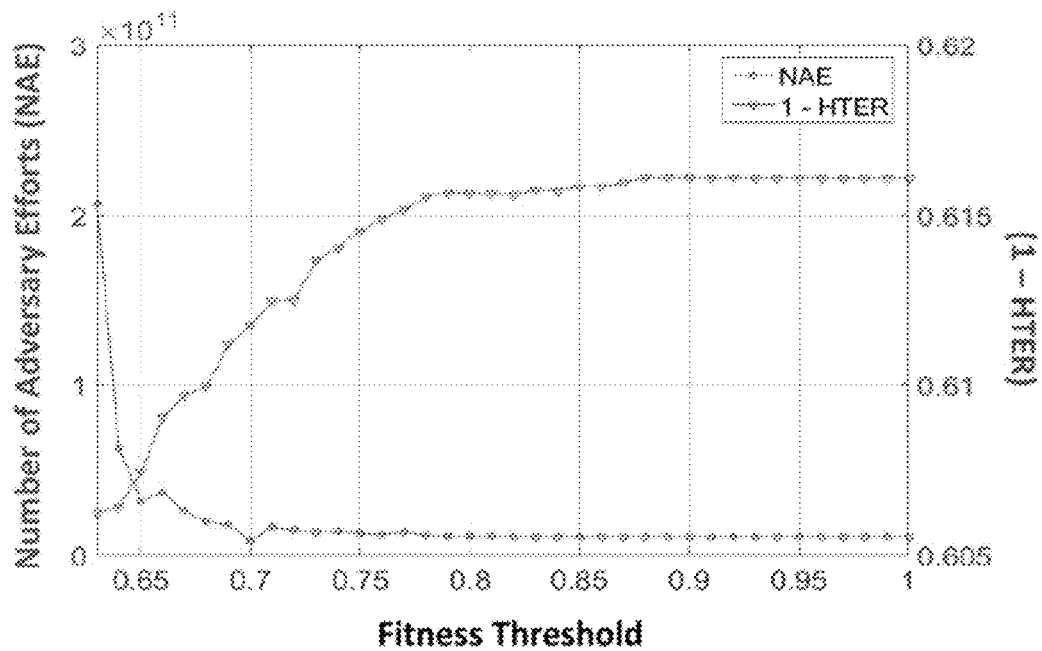
FIGS. 11A-11C are graphical representations of an adversary effort vs. EAS performance using various features, according to one aspect of the present disclosure.
Figure 11B:
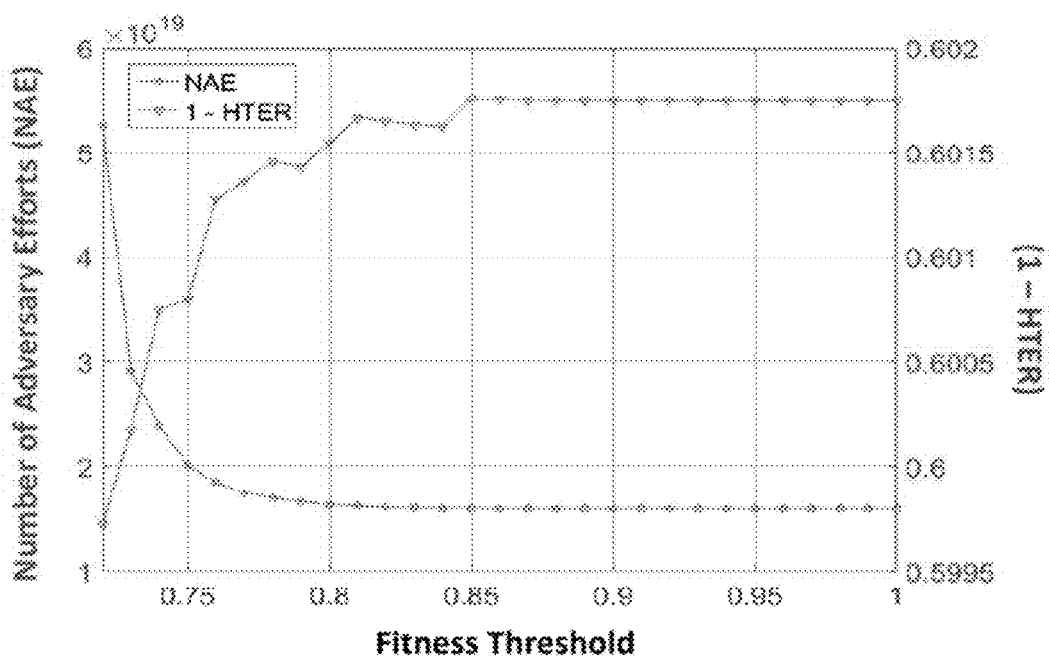
Figure 11C:
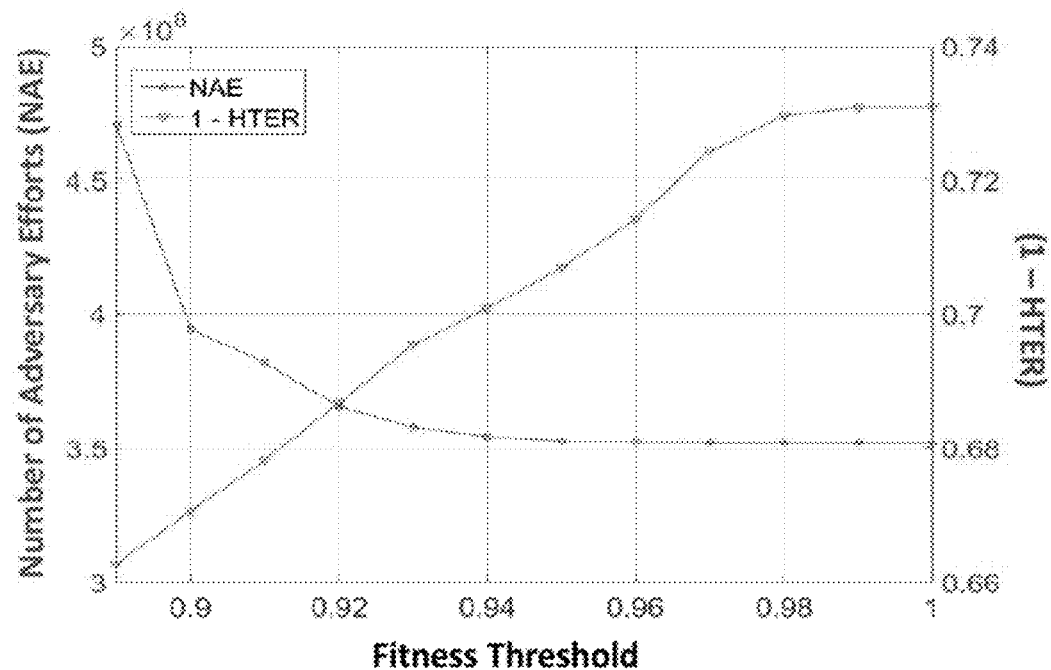

In this research, we evaluate the, performance of the authentication process under spoofing attacks by calculating Half of Total Error Rate (HTER) which is defined as HTER=(FRR+FAR)/2, where: a) False Reject Rate (FRR), is percentage of times when the system fails to match input signal from registered subject to its signature w.r.t. to total attempts, and b) False Accept Rate (FAR), is percentage of times when the system incorrectly matches an input signal from unregistered subject to the signature of the registered subject out of all attempts. Also, as mentioned herein, security strength of the system can be evaluated by the Number of Security Bits (NSB), which is equal to the binary logarithm of the average number of adversarial guesses to get access to the system. The HTER results for EAS simulation using NBC for FFT, DWT, and AR features are shown in FIGS. 11A, 11B, and 11C, respectively. In these figures, the horizontal axis indicates the threshold for NRMSD fitness checking, where threshold equal to 1 rejects totally identical feature vectors. And, the number of adversary efforts is calculated based on volume measurements described in our theoretical analysis. The results for SVM based on 95% fitness threshold are seen in Table 1, Relatively high HTER in our experiment, is due to: 1) evaluating the system using large number of subjects (i.e. 106), and 2) usage of completely different sets of data for training and testing (i.e. more close to practice) rather than cross-validation and etc.

Discussion and Conclusion

A theoretical framework is disclosed for analyzing the security strength of biometric security systems taking into consideration: a) inherent biometric signal entropy, b) entropy reduction due to feature extraction and classification, and c) amount of adversary's knowledge about the system. From the security analysis of the example EAS, a number of important points can be derived for designing any BAS. For BAS design there are two important factors: a) security system performance, and b) security strength. The high entropy in the biometric signal is not conducive for the system performance. Improvements in the system performance of the BAS through feature extraction reduces the entropy, and hence decreases the security strength of the system. Obtained results in Section 5 show the tradeoff between performance and the security strength of BSS. Using the theory developed in this disclosure, we can evaluate the trade-off between the two factors in BSS design.

Chaotic Property and its Security Implications: In BSS design, a common assumption is that usage of chaotic or highly random biometric signals ensures more secure system. However, from our entropy analysis noted above, such a conclusion is naive and agnostic of the feature extraction technique. Feature extraction is commonly used by BAS to extract unique characteristics of individuals who intend to get authenticated to the system. Almost all systems use some form of reversible features. In such a scenario, if an adversary guesses the features then he can generate a biometric signal that is equivalent (if not the same) as a signal from a legitimate subject. As such to ensure successful authentication, the feature extractors typically reduce the biometric signal entropy so that an ML algorithm can learn the underlying patterns. From our analysis we saw that the dimensionality reducing property of feature extractors may reduce signal entropy and hence make features easily guess able. On the other hand, extensive training of ML systems combined with usage of a fitness check prior to authentication execution increases the signal entropy and makes it difficult for the adversary to guess a legitimate biometric signal.

Security Performance and Strength Trade-offs: In our EAS simulation, it is concluded that a system design decision that favors better performance can potentially harm security strength. FIG. 11 shows that for all the features as HTER improves, the adversary effort decreases, resulting in a vulnerable system.

Evaluation of the Theoretical Method and State-of-the-art EAS: Finally, using our geometrical method, we measure the strength of EAS which applies NNs as classifier and the results were very close to entropy results from simulation (Table 1). Furthermore, using the same theoretical approach, we analyzed five state-of-the-art EEG based authentication systems proposed in recent work which used NBC and SVM as their ML algorithms. In the simulation, we follow pre-processing, feature extraction, and classification methods used in the works listed in Table 2. Security performance and strength measurement results show, among these features, PSD showed the highest security strength nearly 83 bits. Also, NBC has less performance (i.e. high HTER) compared to SVM, but its strength is much higher than SVM. The theory also enables an in depth analysis of the trade-off between system performance and security strength, which is useful for design of secure BAS. Type of features and ML algorithm play an important role in the trade-off. Low security strength of SVM is due to simplistic division of the feature domain using a hyperplane into two parts with almost the same volume. In addition, Table 2 shows that the classifier (and also the fitness checker) increases the security bits and increases adversary effort.

Processing System

Figure 13:
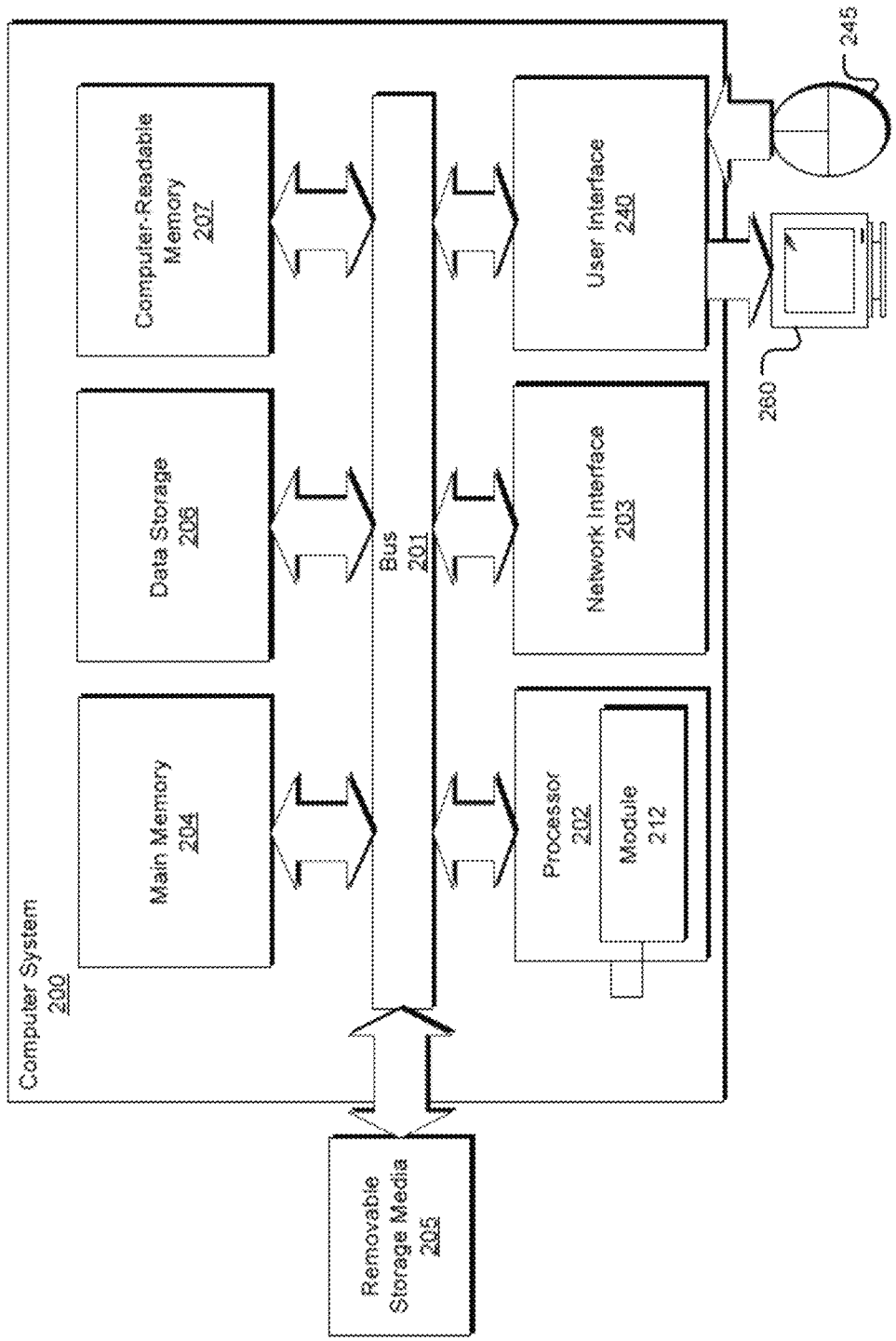
FIG. 13 is a simplified block diagram of an exemplary computer system for effectuating the functions of the framework for security strength and performance analysis, according to one aspect of the present disclosure.

FIG. 13 illustrates an example of a suitable computing and networking environment used to implement various aspects of the present disclosure. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor 202, for example, to constitute a particular hardware-implemented module at one instance of time and to constitute a different hardware-implemented module at a different instance of time.

Hardware-implemented modules 212 may provide information to, and/or receive information from, other hardware-implemented modules 212. Accordingly, the described hardware-implemented modules 212 may be regarded as being communicatively coupled. Where multiple of such hardware-implemented modules 212 exist contemporaneously, communications may be achieved through signal transmission (e.g., over appropriate circuits and buses) that connect the hardware-implemented modules. In embodiments in which multiple hardware-implemented modules 212 are configured or instantiated at different times, communications between such hardware-implemented modules may be achieved, for example, through the storage and retrieval of information in memory structures to which the multiple hardware-implemented modules 212 have access. For example, one hardware-implemented module 212 may perform an operation, and may store the output of that operation in a memory device to which it is communicatively coupled. A further hardware-implemented module 212 may then, at a later time, access the memory device to retrieve and process the stored output. Hardware-implemented modules 212 may also initiate communications with input or output devices.

As illustrated, the computing and networking environment 200 may be a general purpose computing device 200, although it is contemplated that the networking environment 200 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device 200 may include various hardware components, such as a processing unit 202, a main memory 204 (e.g., a system memory), and a system bus 201 that couples various system components of the general purpose computing device 200 to the processing unit 202. The system bus 201 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The general purpose computing device 200 may further include a variety of computer-readable media 207 that includes removable/non-removable media and volatile/non-volatile media, but excludes transitory propagated signals. Computer-readable media 207 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device 200. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 204 includes computer storage media in the form of volatile/nonvolatile memory such as read only memory (ROM) and random access memory (RAM). A basic input/output system (BIOS), containing the basic routines that help to transfer information between elements within the general purpose computing device 200 (e.g., during start-up) is typically stored in ROM. RAM typically contains data and/or program modules that are immediately accessible to and/or presently being operated on by processing unit 202. For example, in one embodiment, data storage 206 holds an operating system, application programs, and other program modules and program data.

Data storage 206 may also include other removable/non-removable, volatile/nonvolatile computer storage media. For example, data storage 206 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 200.

A user may enter commands and information through a user interface 240 or other input devices 245 such as a tablet, electronic digitizer, a microphone, keyboard, and/or pointing device, commonly referred to as mouse, trackball or touch pad. Other input devices 245 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 245 are often connected to the processing unit 202 through a user interface 240 that is coupled to the system bus 201, but may be connected by other interface and bus structures, such as a parallel port, game port or a universal serial bus (USB). A monitor 260 or other type of display device is also connected to the system bus 201 via user interface 240, such as a video interface. The monitor 260 may also be integrated with a touch-screen panel or the like.

The general purpose computing device 200 may operate in a networked or cloud-computing environment using logical connections of a network Interface 203 to one or more remote devices, such as a remote computer. The remote computer may be a personal computer, a server, a router, a network PC, a peer device or other common network node, and typically includes many or all of the elements described above relative to the general purpose computing device 200. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device 200 may be connected to a public and/or private network through the network interface 203. In such embodiments, a modem or other means for establishing communications over the network is connected to the system bus 201 via the network interface 203 or other appropriate mechanism. A wireless networking component including an interface and antenna may be coupled through a suitable device such as an access point or peer computer to a network. In a networked environment, program modules depicted relative to the general purpose computing device 200, or portions thereof, may be stored in the remote memory storage device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for security optimization of a machine-learning based biometric security system (BSS), the method comprising:
   acquiring a dataset comprising a plurality of raw biometric signals corresponding to one or more subjects;
   performing pre-processing on the raw biometric signals to generate conditioned biometric signals;
   performing feature extraction on the conditioned biometric signals using a given feature extraction method to extract a plurality of feature vectors corresponding to the one or more subjects;
   training a classifier of the given machine-learning based BSS to classify given ones of the plurality of feature vectors into a corresponding subject class, wherein the conditioned biometric signals further include an indication of the correct corresponding subject class for each of the plurality of feature vectors; and
   calculating, based at least in part on the trained classifier, a security strength of the given machine-learning based BSS, the calculating comprising determining a guessing entropy of the given machine-learning based BSS against an adversarial attack.

2. The method of claim 1, wherein training the classifier further comprises generating, for each given subject of the one or more subjects, a training data set by dividing the plurality of feature vectors into a training subject class and a training system class, wherein:
   the training subject class comprises the feature vectors associated with the given subject; and
   the training system class comprises the remaining feature vectors not associated with the given subject.

3. The method of claim 1, wherein calculating the security strength comprises:
   calculating a normal response volume comprising the set of acceptable input feature vectors the trained classifier would classify into the correct corresponding subject class;

calculating a suspicion response volume comprising the set of input feature vectors the trained classifier would not classify into the correct corresponding subject class;

calculating a system response volume as the combination of the normal response volume and the suspicion response volume; and calculating the guessing entropy as the base two logarithm of the system response volume divided by the normal response volume.

4. The method of claim 1, wherein calculating the security strength comprises performing a security strength calculation trial of the machine-learning based BSS with respect to a given subject of the one or more subjects by:

generating, from an interval between a minimum feature bound of the feature vectors to a maximum feature bound of the feature vectors, one or more random values to form a test feature vector;

inputting the test feature vector into a simulated classifier corresponding to the trained classifier;

in response to the simulated classifier classifying the test feature vector into a normal response class, calculating the guessing entropy as the number of iterations required for the simulated classifier to classify the test feature vector into the normal response class; and in response to the simulated classifier classifying the test feature vector into a suspicion response class:
generating an additional test feature vector;
inputting the additional test feature vector into the simulated classifier; and
repeating the steps above.

5. The method of claim 4, further comprising:
performing a security strength calculation trial of the machine-learning based BSS with respect to each given subject of the one or more subjects; and
calculating the guessing entropy as the mean of the guessing entropy calculated for each given subject of the one or more subjects.

6. The method of claim 4, further comprising performing a fitness check on the test feature vector in order to detect a replay attack, the fitness check comprising an NRMSD (Normalized Root Mean Square Deviation) between the test feature vector and each one of the extracted plurality of feature vectors.

7. The method of claim 1, wherein the machine-learning based BSS comprises one or more of:
a neural network machine learning algorithm;
a Naïve Bayes Classifier (NBC); and
a Support Vector Machine (SVM).

8. The method of claim 1, wherein the raw biometric signals comprise EEG (electroencephalogram) data and the BSS is an ESS (EEG-based Security System).

9. The method of claim 1, wherein pre-processing comprises applying one or more of: a zero-mean algorithm, a unit-variance algorithm, and a finite element response (FIR) filter algorithm.

10. The method of claim 1, wherein the given feature extraction method comprises one or more of:
a Fast Fourier Transform (FFT);
a Discrete Wavelet Transform (DFT); and
an Auto-Regression (AR) algorithm.

11. The method of claim 1, wherein the adversarial attack is one or more of:
a spoofing attack comprising a spoofed feature vector; and
a brute-force attack comprising a test feature vector having one or more altered or randomly generated values.

12. The method of claim 3, wherein the adversarial attack is a successful spoofing attack comprising a spoofed feature vector, wherein the spoofed feature vector:
lies within the system response volume; and
does not lie within the volume corresponding to a hyper-sphere having a pre-defined radius centered about each feature vector.

13. A security optimization apparatus for a machine-learning based biometric security system (BSS), the apparatus comprising:
a data acquisition system, the data acquisition system configured to acquire a dataset comprising a plurality of raw biometric signals corresponding to one or more subjects;
a data pre-processing system, the data pre-processing system configured to perform pre-processing on the raw biometric signals to generate conditioned biometric signals;
a feature extractor, the feature extractor consisting of a given feature extraction method for extracting from the conditioned biometric signals a plurality of feature vectors corresponding to the one or more subjects;
a classifier training system, the classifier training system training a classifier of the given machine-learning based BSS to classify given ones of the plurality of feature vectors into a corresponding subject class, wherein the conditioned biometric signals further include an indication of the correct corresponding subject class for each of the plurality of feature vectors; and
a security strength analysis system, the security strength analysis system configured to calculate, based at least in part on the trained classifier, a security strength of the given machine-learning based BSS, the calculating comprising determining a guessing entropy of the given machine-learning based BSS against an adversarial attack.

14. The security optimization apparatus of claim 13, wherein the classifier training system generates, for each given subject of the one or more subjects, a training data set by dividing the plurality of feature vectors into a training subject class and a training system class, wherein:
the training subject class comprises the feature vectors associated with the given subject; and
the training system class comprises the remaining feature vectors not associated with the given subject.

15. The security optimization apparatus of claim 13, wherein the security strength analysis system is configured to:
calculate a normal response volume comprising the set of acceptable input feature vectors the trained classifier would classify into the correct corresponding subject class;
calculate a suspicion response volume comprising the set of input feature vectors the trained classifier would not classify into the correct corresponding subject class;
calculate a system response volume as the combination of the normal response volume and the suspicion response volume; and
calculate the guessing entropy as the base two logarithm of the system response volume divided by the normal response volume.

16. The security optimization apparatus of claim 13, wherein the security strength analysis system performs a security strength calculation trial of the machine-learning based BSS with respect to a given subject of the one or more subjects by:

generating, from an interval between a minimum feature bound of the feature vectors to a maximum feature bound of the feature vectors, one or more random values to form a test feature vector;

inputting the test feature vector into a simulated classifier corresponding to the trained classifier;

in response to the simulated classifier classifying the test feature vector into a normal response class, calculating the guessing entropy as the number of iterations required for the simulated classifier to classify the test feature vector into the normal response class; and in response to the simulated classifier classifying the test feature vector into a suspicion response class:
   generating an additional test feature vector;
   inputting the additional test feature vector into the simulated classifier; and
   repeating the steps above.

17. The security optimization apparatus of claim 16, wherein the security strength analysis system performs a security strength calculation trial of the machine-learning based BSS with respect to each given subject of the one or more subjects; and
calculates the guessing entropy as the mean of the guessing entropy calculated for each given subject of the one or more subjects.

18. The security optimization apparatus of claim 16, wherein the security strength analysis system performs a fitness check on the test feature vector in order to detect a replay attack, the fitness check comprising an NRMSD (Normalized Root Mean Square Deviation) between the test feature vector and each one of the extracted plurality of feature vectors.

19. The security optimization apparatus of claim 13, wherein the machine-learning based BSS comprises one or more of:
   a neural network machine learning algorithm;
   a Naïve Bayes Classifier (NBC); and
   a Support Vector Machine (SVM).

20. The security optimization apparatus of claim 13, wherein the feature extractor comprises one or more of: a Fast Fourier Transform (FFT), a Discrete Wavelet Transform (DFT), and an Auto-Regression (AR) algorithm, as the given feature extraction method.

* * * * *